United States Patent
Khoshnevisan et al.

(10) Patent No.: US 12,199,911 B2
(45) Date of Patent: *Jan. 14, 2025

(54) RANK AND RESOURCE SET SIGNALING TECHNIQUES FOR MULTIPLE TRANSMISSION-RECEPTION POINT COMMUNICATIONS

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,866

(22) Filed: Jun. 29, 2023

(65) Prior Publication Data
US 2023/0353318 A1 Nov. 2, 2023

Related U.S. Application Data

(63) Continuation of application No. 17/538,870, filed on Nov. 30, 2021, now Pat. No. 11,728,947.

(60) Provisional application No. 63/131,289, filed on Dec. 28, 2020.

(51) Int. Cl.
*H04L 5/00* (2006.01)

(52) U.S. Cl.
CPC .......... *H04L 5/0051* (2013.01); *H04L 5/0032* (2013.01)

(58) Field of Classification Search
CPC ............................ H04L 5/0051; H04L 5/0032
See application file for complete search history.

(56) References Cited

U.S. PATENT DOCUMENTS

| 2018/0205440 A1* | 7/2018 | Enescu | ................. H04B 7/0626 |
| 2021/0211254 A1* | 7/2021 | Park | ..................... H04L 27/2607 |

(Continued)

FOREIGN PATENT DOCUMENTS

WO    2020019317 A1    1/2020

OTHER PUBLICATIONS

International Search Report and Written Opinion—PCT/US2021/072649—ISA/EPO—Mar. 16, 2022.

(Continued)

*Primary Examiner* — Jackie Zuniga Abad
(74) *Attorney, Agent, or Firm* — Holland & Hart LLP

(57) ABSTRACT

Methods, systems, and devices for wireless communication are described in which a user equipment (UE) may transmit one or more uplink communications to multiple transmission-reception points (TRPs). Transmission parameters for each repetition may be based on parameters (e.g., a number of antenna ports, a spatial domain filter or beam, a rank or number of layers, or any combinations thereof) that are determined from an indication of whether the repetitions are to use different sounding reference signal (SRS) resource sets, and indicated SRS resource of each SRS resource set. The indication may include a same number of bits regardless of whether one SRS resource set is used or multiple SRS resource sets are used, and may be based on a prior configuration of the UE.

20 Claims, 19 Drawing Sheets

(56) References Cited

U.S. PATENT DOCUMENTS

2021/0306123 A1  9/2021  Gao et al.
2022/0209914 A1  6/2022  Khoshnevisan et al.

OTHER PUBLICATIONS

Xiaomi: "Enhancements on Multi-TRP for PDCCH, PUCCH and PUSCH", 3GPP Draft, R1-2009028, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946796, 18 Pages, Section 3.6.

* cited by examiner

RANK AND RESOURCE SET SIGNALING TECHNIQUES FOR MULTIPLE TRANSMISSION-RECEPTION POINT COMMUNICATIONS

CROSS REFERENCE

This patent application is a continuation of U.S. Non-Provisional application Ser. No. 17/538,870 by KHOSHNEVISAN et al. entitled "RANK AND RESOURCE SET SIGNALING TECHNIQUES FOR MULTIPLE TRANSMISSION-RECEPTION POINT COMMUNICATIONS" and filed on Nov. 30, 2021, which claims the benefit of U.S. Provisional Patent Application No. 63/131,289 by KHOSHNEVISAN et al., entitled "RANK AND RESOURCE SET SIGNALING TECHNIQUES FOR MULTIPLE TRANSMISSION-RECEPTION POINT COMMUNICATIONS," filed Dec. 28, 2020, assigned to the assignee hereof, and expressly incorporated by reference herein.

FIELD OF TECHNOLOGY

The following relates to wireless communication, including rank and resource set signaling techniques for multiple transmission-reception point (TRP) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications using one or multiple antenna arrays at different devices. For instance, a network may communicate with a UE using one or more transmission/reception point (TRPs), where each TRP and the UE may have one or more antenna arrays to form directional beams. Efficient communications between UEs and one or multiple TRPs may help to enhance network throughput, latency, and reliability, and thus techniques to further improve efficient communications are desirable.

SUMMARY

The described techniques relate to improved methods, systems, devices, and apparatuses that support rank and resource set signaling techniques for multiple transmission-reception point (TRP) communications. Various aspects provide techniques for communications between a user equipment (UE) and multiple TRPs in which the UE may transmit an uplink communication to one or multiple TRPs to enhance the likelihood of successful receipt of the uplink communication. In some cases, the UE may transmit uplink communications based on parameters (e.g., a number of antenna ports, a spatial domain filter or beam, a rank or number of layers, or any combinations thereof) that are determined from one or more sounding reference signal (SRS) resources. The SRS resources may be selected from one or two sets of SRS resources that are configured at the UE, and may be indicated in control information provided to the UE.

In some cases, a base station or TRP may transmit configuration information to a UE that indicates a number of bits that are to be included in a control information field that indicates one or two SRS resource sets with which a first uplink communication is to be associated. Based on the configuration information, the UE may receive the control information, and determine whether one or two SRS resource sets are associated with the first uplink communication, and transmit the first uplink communication based on the one or two SRS resource sets. In some cases, the number of bits in the control information are determined based on a maximum number of bits needed for indicating SRS resources from one SRS resource set or for indicating SRS resources from two SRS resource sets. In other cases, available combinations of SRS resources from one or two SRS resource sets may be jointly coded and transmitted in a same resource indicator field having a number of bits that is based on the number of available combinations of SRS resources.

A method for wireless communication at a UE is described. The method may include receiving, from a base station, a control information configuration that indicates a quantity of bits that are to be included in a control information field that indicates one or two resource sets with which a first uplink communication is to be associated, receiving, from the base station, a first control information communication that includes the control information field and that schedules the first uplink communication for the UE, determining, based on the first control information communication and the control information configuration, whether one or two SRS resource sets are associated with the first uplink communication, and transmitting the first uplink communication to the base station based on the determining.

An apparatus for wireless communication at a UE is described. The apparatus may include a processor, memory in electronic communication with the processor, and instructions stored in the memory. The instructions may be executable by the processor to cause the apparatus to receive, from a base station, a control information configuration that indicates a quantity of bits that are to be included in a control information field that indicates one or two SRS resource sets with which a first uplink communication is to be associated, receive, from the base station, a first control information communication that includes the control information field and that schedules the first uplink communication for the UE, determine, based on the first control information communication and the control information configuration, whether one or two SRS resource sets are associated with the first uplink communication, and transmit the first uplink communication to the base station based on the determining.

Another apparatus for wireless communication at a UE is described. The apparatus may include means for receiving, from a base station, a control information configuration that indicates a quantity of bits that are to be included in a control information field that indicates one or two SRS resource sets with which a first uplink communication is to be associated, means for receiving, from the base station, a first control information communication that includes the control information field and that schedules the first uplink communication for the UE, means for determining, based on the first control information communication and the control information configuration, whether one or two SRS resource sets are associated with the first uplink communication, and means for transmitting the first uplink communication to the base station based on the determining.

A non-transitory computer-readable medium storing code for wireless communication at a UE is described. The code may include instructions executable by a processor to receive, from a base station, a control information configuration that indicates a quantity of bits that are to be included in a control information field that indicates one or two SRS resource sets with which a first uplink communication is to be associated, receive, from the base station, a first control information communication that includes the control information field and that schedules the first uplink communication for the UE, determine, based on the first control information communication and the control information configuration, whether one or two SRS resource sets are associated with the first uplink communication, and transmit the first uplink communication to the base station based on the determining.

In some examples of the method, apparatuses, and non-transitory computer-readable medium described herein, the determining may include operations, features, means, or instructions for determining, based on the first control information communication and the control information configuration, the number of SRS resources for each SRS resource set associated with the first uplink communication. In some examples of the method, apparatuses, and non-transitory computer-readable medium described herein, the determining may include operations, features, means, or instructions for determining, based on a first bit of the first control information communication, whether one or two SRS resource sets are associated with the first uplink communication, and where the control information field includes a set of bits that indicate a number of SRS resources for each SRS resource set associated with the first uplink communication. In some examples of the method, apparatuses, and non-transitory computer-readable medium described herein, the first bit may be an initial bit of the control information field, or may be in a separate field in the first control information communication.

In some examples of the method, apparatuses, and non-transitory computer-readable medium described herein, the set of bits includes a maximum of a first number of bits or a second number of bits, the first number of bits determined based on a first maximum rank when one SRS resource set is associated with the first uplink communication, and the second number of bits determined based on a second maximum rank when two SRS resource sets are associated with the first uplink communication. In some examples of the method, apparatuses, and non-transitory computer-readable medium described herein, the second maximum rank is less than the first maximum rank. In some examples of the method, apparatuses, and non-transitory computer-readable medium described herein, the second maximum rank is a fixed value or a configured value that is provided with the control information configuration. In some examples of the method, apparatuses, and non-transitory computer-readable medium described herein, the configured value of the second maximum rank may be based on a capability of the UE that is transmitted to the base station. In some examples of the method, apparatuses, and non-transitory computer-readable medium described herein, zero-padding may be used in the set of bits when a number of bits necessary to indicate the rank of one or both of the SRS resource sets is less than a total number of bits of the set of bits.

In some examples of the method, apparatuses, and non-transitory computer-readable medium described herein, the first number of bits is determined based on the first SRS resource set having a different number of SRS resources than the second SRS resource set. In some examples of the method, apparatuses, and non-transitory computer-readable medium described herein, the first number of bits may be associated with the first SRS resource set. In some examples of the method, apparatuses, and non-transitory computer-readable medium described herein, the first number of bits may be associated with either the first SRS resource set or the second SRS resource set, and a separate bit in the control information field provides an indication of which of the first SRS resource set or the second SRS resource set is associated with the first uplink communication.

In some examples of the method, apparatuses, and non-transitory computer-readable medium described herein, the second number of bits may be associated with both the first SRS resource set and the second SRS resource set, and a first subset of the second number of bits indicates one or more SRS resources within the first SRS resource set and a second subset of the second number of bits indicates one or more SRS resources within the second SRS resource set. In some examples of the method, apparatuses, and non-transitory computer-readable medium described herein, the second number of bits may be associated with both the first SRS resource set and the second SRS resource set, and provides a joint indication of one or more SRS resources within each of the SRS resource sets based on a same number of layers associated with each SRS resource set.

In some examples of the method, apparatuses, and non-transitory computer-readable medium described herein, the determining may include operations, features, means, or instructions for decoding the control information field to identify a set of bits and identifying, based on a mapping for the set of bits, a number of SRS resources for each SRS resource set associated with the first uplink communication.

In some examples of the method, apparatuses, and non-transitory computer-readable medium described herein, a first SRS resource set may be ordered ahead of a second SRS resource set, and the quantity of bits that are included in the control information field is determined as a sum of a first number of possibilities to indicate a first number of SRS resources associated with the first SRS resource set when a single SRS resource set is associated with the first uplink communication, and a second number of possibilities to indicate a second number of SRS resources associated with both the first and the second SRS resource set when both the first SRS resource set and the second SRS resource set are associated with the first uplink communication.

In some examples of the method, apparatuses, and non-transitory computer-readable medium described herein, a first SRS resource set or a second SRS resource set may be ordered as an initial SRS resource set and the quantity of bits that is included in the control information field is determined as a sum of a first number of possibilities to indicate a first number of SRS resources associated with the initial SRS resource set when a single SRS resource set is associated with the first uplink communication, and a second number of possibilities to indicate a second number of SRS resources associated with both the first and the second SRS resource set when a both the first SRS resource set and the second SRS resource set are associated with the first uplink communication. In some examples of the method, apparatuses, and non-transitory computer-readable medium described herein, different bit values of the control information field are mapped to different possibilities of a number of the SRS resources that are associated with the first uplink communication.

A method for wireless communication at a base station is described. The method may include transmitting, to a UE, a control information configuration that indicates a quantity of bits that are to be included in a control information field that indicates one or two SRS resource sets with which a first uplink communication is to be associated, determining whether one SRS resource set or two SRS resource sets are associated with the first uplink communication, transmitting, to the UE, a first control information communication that includes the control information field and that schedules the first uplink communication for the UE and indicates whether one SRS resource set or two SRS resource sets are associated with the first uplink communication, and receiving the first uplink communication from the UE based on the first control information communication.

An apparatus for wireless communication at a base station is described. The apparatus may include a processor, memory in electronic communication with the processor, and instructions stored in the memory. The instructions may be executable by the processor to cause the apparatus to transmit, to a UE, a control information configuration that indicates a quantity of bits that are to be included in a control information field that indicates one or two SRS resource sets with which a first uplink communication is to be associated, determine whether one SRS resource set or two SRS resource sets are associated with the first uplink communication, transmit, to the UE, a first control information communication that includes the control information field and that schedules the first uplink communication for the UE and indicates whether one SRS resource set or two SRS resource sets are associated with the first uplink communication, and receive the first uplink communication from the UE based on the first control information communication.

Another apparatus for wireless communication at a base station is described. The apparatus may include means for transmitting, to a UE, a control information configuration that indicates a quantity of bits that are to be included in a control information field that indicates one or two SRS resource sets with which a first uplink communication is to be associated, means for determining whether one SRS resource set or two SRS resource sets are associated with the first uplink communication, means for transmitting, to the UE, a first control information communication that includes the control information field and that schedules the first uplink communication for the UE and indicates whether one SRS resource set or two SRS resource sets are associated with the first uplink communication, and means for receiving the first uplink communication from the UE based on the first control information communication.

A non-transitory computer-readable medium storing code for wireless communication at a base station is described. The code may include instructions executable by a processor to transmit, to a UE, a control information configuration that indicates a quantity of bits that are to be included in a control information field that indicates one or two SRS resource sets with which a first uplink communication is to be associated, determine whether one SRS resource set or two SRS resource sets are associated with the first uplink communication, transmit, to the UE, a first control information communication that includes the control information field and that schedules the first uplink communication for the UE and indicates whether one SRS resource set or two SRS resource sets are associated with the first uplink communication, and receive the first uplink communication from the UE based on the first control information communication.

In some examples of the method, apparatuses, and non-transitory computer-readable medium described herein, the control information field further indicates a number of SRS resources to be associated with the first uplink communication. In some examples of the method, apparatuses, and non-transitory computer-readable medium described herein, a first bit of the first control information communication indicates whether one or two SRS resource sets are associated with the first uplink communication, and where the control information field includes a set of bits that indicate a number of SRS resources for each SRS resource set associated with the first uplink communication. In some examples of the method, apparatuses, and non-transitory computer-readable medium described herein, the first bit may be an initial bit of the control information field, or may be in a separate field in the first control information communication.

In some examples of the method, apparatuses, and non-transitory computer-readable medium described herein, the set of bits includes a maximum of a first number of bits or a second number of bits, the first number of bits determined based on a first maximum rank when one SRS resource set is associated with the first uplink communication, and the second number of bits determined based on a second maximum rank set when two SRS resource sets are associated with the first uplink communication. In some examples of the method, apparatuses, and non-transitory computer-readable medium described herein, the second maximum rank is less than the first maximum rank. In some examples of the method, apparatuses, and non-transitory computer-readable medium described herein, the second maximum rank may be a fixed value or a configured value that is provided with the control information configuration. In some examples of the method, apparatuses, and non-transitory computer-readable medium described herein, the configured value of the second maximum rank may be based on a capability of the UE that is transmitted to the base station. In some examples of the method, apparatuses, and non-transitory computer-readable medium described herein, zero-padding may be used in the set of bits when a number of bits necessary to indicate the rank of one or both of the SRS resource sets is less than a total number of bits of the set of bits.

In some examples of the method, apparatuses, and non-transitory computer-readable medium described herein, the first number of bits may be determined based on the first SRS resource set having a different number of SRS resources than the second SRS resource set. In some examples of the method, apparatuses, and non-transitory computer-readable medium described herein, the first number of bits may be associated with the first SRS resource set. In some examples of the method, apparatuses, and non-transitory computer-readable medium described herein, the first number of bits may be associated with either the first SRS resource set or the second SRS resource set, and a separate bit in the control information field provides an indication of which of the first SRS resource set or the second SRS resource set is associated with the first uplink communication.

In some examples of the method, apparatuses, and non-transitory computer-readable medium described herein, the second number of bits may be associated with both the first SRS resource set and the second SRS resource set, and a first subset of the second number of bits indicates one or more SRS resources within the first SRS resource set and a second subset of the second number of bits indicates one or more SRS resources within the second SRS resource set. In some examples of the method, apparatuses, and non-transitory computer-readable medium described herein, the second number of bits may be associated with both the first SRS resource set and the second SRS resource set, and provides a joint indication of one or more SRS resources within each of the SRS resource sets based on a same number of layers associated with each SRS resource set.

Some examples of the method, apparatuses, and non-transitory computer-readable medium described herein may further include operations, features, means, or instructions for determining a number of SRS resources for each SRS resource set associated with the first uplink communication, identifying a mapping between a codepoint and the determined number of SRS resources, and where the control information field indicates the codepoint. In some examples of the method, apparatuses, and non-transitory computer-readable medium described herein, different bit values of the control information field may be mapped to different possibilities of the SRS resources that are associated with the first uplink communication.

In some examples of the method, apparatuses, and non-transitory computer-readable medium described herein, a first SRS resource set may be ordered ahead of a second SRS resource set, and the quantity of bits that are included in the control information field is determined as a sum of a first number of possibilities to indicate a first number of SRS resources associated with the first SRS resource set when a single SRS resource set is associated with the first uplink communication, and a second number of possibilities to indicate a second number of SRS resources associated with both the first and the second SRS resource set when both the first SRS resource set and the second SRS resource set are associated with the first uplink communication.

In some examples of the method, apparatuses, and non-transitory computer-readable medium described herein, a first SRS resource set or a second SRS resource set may be ordered as an initial SRS resource set and the quantity of bits that are included in the control information field is determined as a sum of a first number of possibilities to indicate a first number of SRS resources associated with the initial SRS resource set when a single SRS resource set is associated with the first uplink communication, and a second number of possibilities to indicate a second number of SRS resources associated with both the first and the second SRS resource set when a both the first SRS resource set and the second SRS resource set are associated with the first uplink communication.

DETAILED DESCRIPTION

Figure 1:
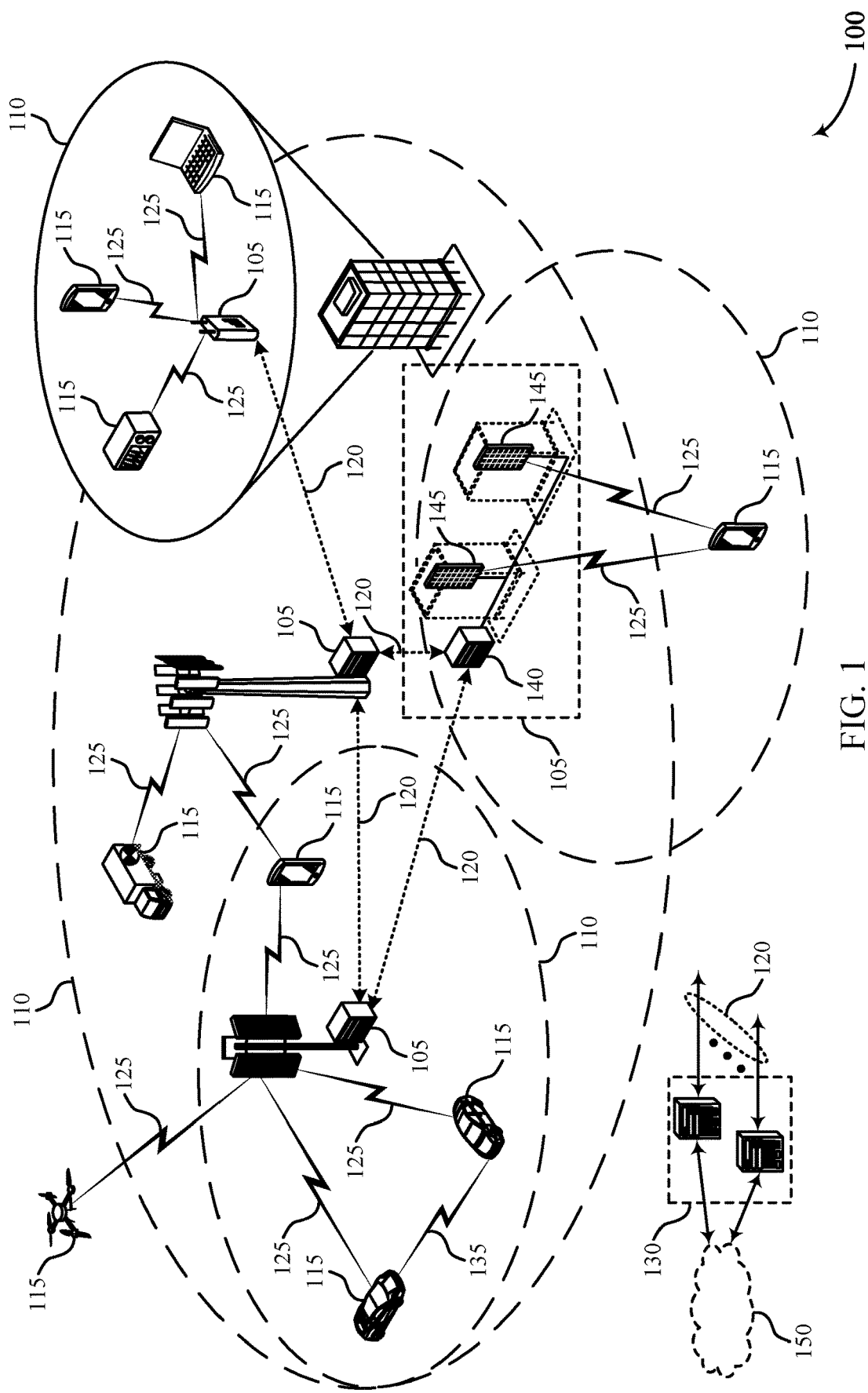
FIG. 1 illustrates an example of a wireless communications system that supports rank and resource set signaling techniques for multiple transmission-reception point (TRP) communications in accordance with aspects of the present disclosure.

In some wireless communications systems, the network may communicate with a user equipment (UE) using one or more transmission-reception points (TRPs). For example, the network may communicate with the UE using a single TRP at a base station, using multiple TRPs at a same base station, or using multiple TRPs across multiple base stations. In such systems, transmission parameters of each device (e.g., each UE, each TRP, each base station) may vary across the system (e.g., because different operating frequencies, different beams, different numbers of antenna ports, etc.), and thus separate parameters may be indicated for communications with different TRPs. For example, in a multi-TRP system, two or more TRPs may coordinate and configure a UE to transmit multiple sets of repetitions of an uplink communication in which one set of repetitions are directed to a first TRP and a different set of repetitions are directed to a second TRP. Such techniques may enhance the likelihood of at least one of the TRPs successfully receiving the uplink communication, and thus enhance communications reliability. However, when uplink transmissions to different TRPs have different transmission parameters, flexibility in providing an indication of the different transmission parameters may be desired in order to provide sufficient information to the UE for transmissions to different TRPs. Existing configuration and control information techniques may not provide sufficient information for communications to multiple TRPs for an uplink communication in some cases. Various aspects of the present disclosure provide enhanced techniques that allow for flexible and efficient signaling of configuration and control information associated with multiple TRPs.

In some cases, the UE may transmit uplink communications based on parameters (e.g., a number of antenna ports, a spatial domain filter or beam, a rank or number of layers, or any combinations thereof) that are determined from a sounding reference signal (SRS) resource. The SRS resource may be selected from a set of SRS resources that are configured at the UE, and may be indicated in control information provided to the UE. In some cases, multiple sets of SRS resources may be configured at the UE, and one or multiple indicators in the control information (e.g., downlink control information (DCI)) may be mapped to SRS resources of one or more of the sets of SRS resources.

In some deployments, SRS resources may be used to indicate uplink shared channel (e.g., physical uplink shared channel (PUSCH)) transmission parameters as well as SRS transmission parameters. In some cases, two types of PUSCH transmissions are supported, namely codebook and non-codebook PUSCH transmissions. For non-codebook based uplink transmissions, a UE may be configured with one SRS resource set with "usage" set to "noncodebook." In such cases, a maximum of four SRS resources within the one SRS resource set can be configured for the UE, and each SRS resource has one associated antenna port. A SRS resource indicator (SRI) field in a DCI transmission (e.g., a DCI that schedules PUSCH) indicates one or multiple SRS resources, and the number of indicated SRS resources determines the rank (e.g., number of layers) for the scheduled PUSCH. The PUSCH communication is transmitted with a same precoder as well as spatial domain filter (e.g., beam) as the indicated SRS resources. The SRI may include a bit field that is mapped to an index of configured SRS resources in the SRS resource set, where a size of the bit field is based on a number of configured SRS resources in the SRS resource set and the number of layers of the PUSCH transmission.

In cases where multiple instances of an uplink communication (e.g., a same transport block (TB)) are transmitted to multiple TRPs, it may be useful to configure multiple SRS resource sets to may provide additional options for indicating uplink transmission parameters for the multiple uplink communications. For example, if a first link between a UE and a first TRP is blocked, a first repetition of an uplink transmission to the first TRP may not be successfully received. However, if a second link between the UE and a second TRP is not blocked, a second repetition of the uplink transmission to the second TRP may be successfully received and decoded. Thus, such techniques may increase diversity in communications and thereby enhance reliability and efficiency in cases where one or more links may experience relatively poor channel conditions. However, in existing deployments all of the repetitions are transmitted with the same beam (e.g., the SRI field of the DCI is applied to all the repetitions), and when different PUSCH repetitions are intended to be received at different TRPs/panels/antennas at the base station side, such a same beam for all the repetitions may not be well suited for receipt at each of the different TRPs/panels/antennas. In accordance with techniques as discussed herein, a base station or TRP may configure multiple SRS resource sets that may be used for different repetitions of different TRPs/panels/antennas. In some cases, different PUSCH transmission occasions (i.e. repetitions) corresponding to the same TB are transmitted in different slots or mini-slots, and a number of repetitions may be configured (e.g., via radio resource control (RRC) signaling) or may be indicated dynamically (e.g., in DCI that schedules the uplink communication, such as in a time domain resource assignment (TDRA) field).

In cases where multiple SRS resource sets are configured (e.g., two SRS resource sets that are configured for two TRPs), simply transmitting two separate SRI fields in the DCI may result in an increased DCI overhead, as twice as many bits are needed to provide the separate SRI fields. In accordance with some aspects of the present disclosure, resource indications for multiple different sets of SRS resources may be provided with reduced overhead relative to simply transmitting two SRI fields. Further, resource indications may be provided that have a same number of bits in DCI, such that different SRS resources from one or more SRS resource sets may be indicated in an information field having a consistent size, which may provide for more efficient processing at a UE (e.g., the UE does not have to blind decode multiple candidate DCI sizes or formats).

Such techniques provide that SRS resources for an uplink communication may be indicated for different modes, including a first mode in which a single SRS resource set is used for an uplink communication (e.g., a single beam PUSCH and/or transmissions to a single TRP), and a second mode in which two SRS resource sets are used for an uplink communication (e.g., for a PUSCH with two sets of repetitions transmitted with two respective beams and/or to multiple TRPs). In cases of the first mode, a maximum number of layers that can be indicated may be denoted as $L_{max}$. Hence, a resource indication (e.g., SRI) can indicate up to $L_{max}$ SRS resources within one SRS resource set. In cases of the second mode, a maximum number of layers that can be indicated for each SRS resource set may be denoted as $L_{max}'$, which is smaller than $L_{max}$ for an associated SRS resource set. Thus, there are fewer possibilities for indication of one or more SRS resources when the second mode is used, and two indications are needed (i.e., one associated with the first SRS resource set and another associated with the second SRS resource set). The reason that $L_{max}'$ is less than $L_{max}$ is that when a base station elects to allocate an uplink transmission using multiple repetitions on different beams (e.g., due to relatively poor channel conditions, reliability targets for the communication, latency targets for the communication, etc.), the base station may schedule the transmission with a smaller number of layers in order to provide enhanced reliability. Thus, the number of bits that are needed in the DCI for SRI field(s) may be determined, in accordance with various techniques as discussed herein, based on a maximum number of bits needed for the first mode and the second mode. In other cases, information for which mode is to be used as well as associated resource indications from the one or more sets of SRS resources, may be jointly coded and indicated by the same field (e.g., a same set of bits) of the DCI (e.g., a mapping is provided for the mode and SRS resources within the sets of SRS resources).

In some cases, a base station or TRP may transmit configuration information to a UE that indicates a number of bits that are to be included in a control information field that indicates one or two SRS resource sets with which a first uplink communication is to be associated. Based on the configuration information, the UE may receive the control information, and determine whether one or two SRS resource sets are associated with the first uplink communication, and transmit the first uplink communication based on the one or two SRS resource sets and indicated SRS resources within the one or two SRS resource sets. In some cases, the number of bits in the control information are determined based on a maximum number of bits needed for indicating SRS resources from one SRS resource set or for indicating SRS resources from two SRS resource sets. In other cases, available combinations of SRS resources from one or two SRS resource sets may be jointly coded and transmitted in a same resource indicator field having a number of bits that is based on the number of available combinations of SRS resources.

Aspects of the disclosure are initially described in the context of wireless communications systems. Aspects of the disclosure are further illustrated by and described with reference to SRS resources for multiple repetitions, process flow diagrams, apparatus diagrams, system diagrams, and flowcharts that relate to rank and resource set signaling techniques for multiple TRP communications.

FIG. 1 illustrates an example of a wireless communications system 100 that supports rank and resource set signaling techniques for multiple TRP communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may be further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Additionally, a base station 105 in the wireless communications system 100 may include one or more TRPs. Each TRP may be associated with one or more antenna ports, beams, and beam indices. In some cases, a UE 115 may transmit one or more uplink communications to multiple TRPs, and such communications may include multiple repetitions of an uplink communication to multiple TRPs to enhance the likelihood of successful receipt of the uplink communication. In some cases, the UE 115 may transmit uplink communications based on parameters (e.g., a number of antenna ports, a spatial domain filter or beam, a rank or number of layers, or any combinations thereof) that are determined from SRS resources associated with the uplink communication. The SRS resources may be selected from one or two sets of SRS resources that are configured at the UE 115, and may be indicated in control information provided to the UE 115.

Figure 2:
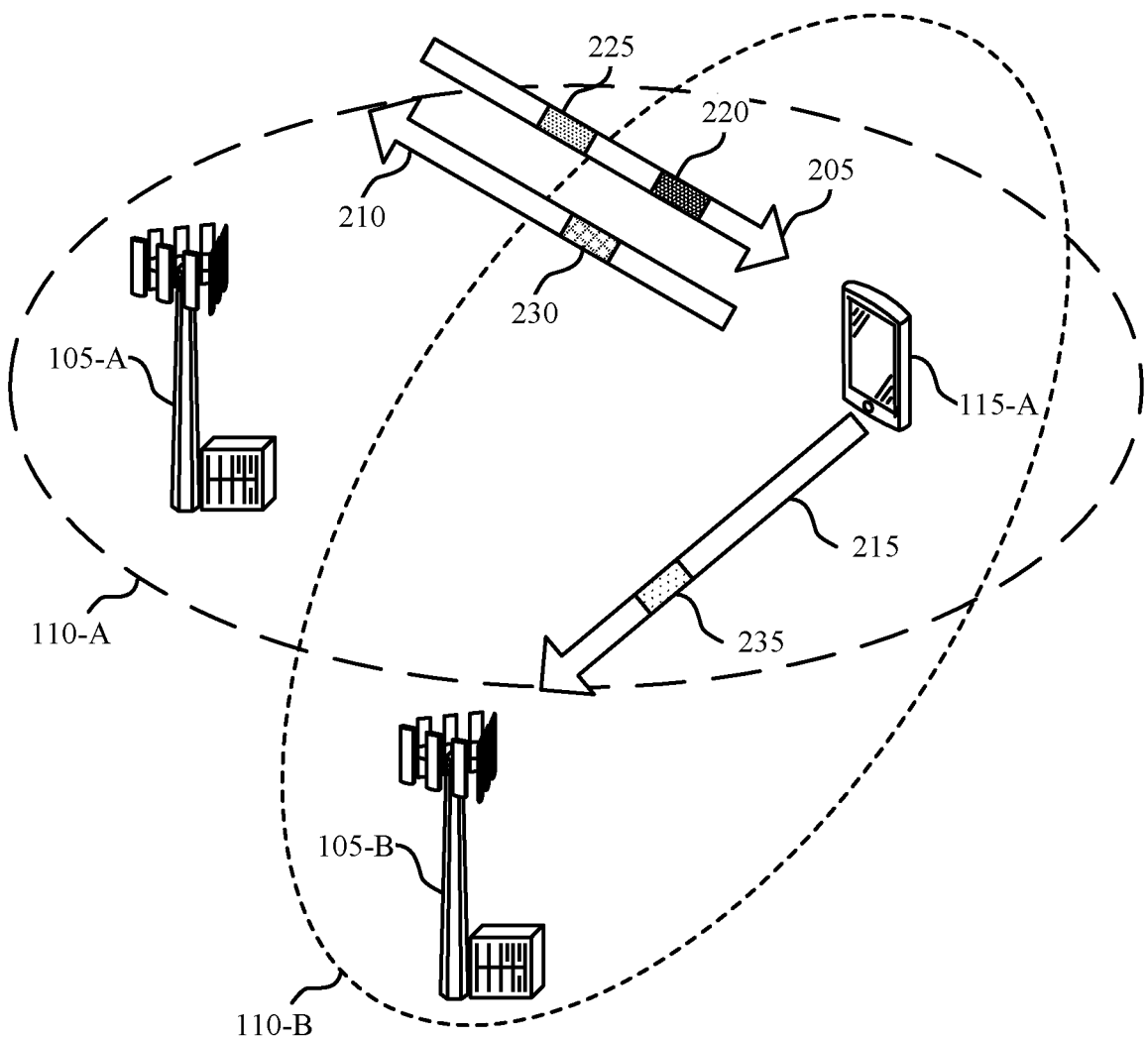
FIG. 2 illustrates an example of a portion of a wireless communications system that supports rank and resource set signaling techniques for multiple TRP communications in accordance with aspects of the present disclosure.

FIG. 2 illustrates an example of a wireless communications system 200 that supports rank and resource set signaling techniques for multiple TRP communications in accordance with aspects of the present disclosure. For example, the wireless communications system 200 includes base stations 105-a and 105-b, and a UE 115-a, which may be examples of the respective devices as described with reference to FIG. 1. It is to be understood that references to specific wireless devices (e.g., UEs, TRPs, base stations) in the below figures are provided for illustrative purposes, and different wireless devices not specifically referred to herein may be used interchangeably with those described herein. Likewise, the described operations performed by a UE 115 may, in some cases, be performed by a base station 105 (or TRP), and vice versa. In some examples, multiple TRPs may each be a standalone TRPs or may be part of one base station 105 or different base stations 105. Additionally or alternatively, the base stations 105 or TRPs may be a component of or an example of an IAB node, a repeater node (e.g., configured with some retransmission capability), or the like. Further, the UE 115-a may be an example of a customer premises equipment (CPE), a sidelink node, a repeater node, or the like.

A first base station 105-a (e.g., that is associated with a first TRP) may provide coverage area 110-a, and a second base station 105-b (e.g., that is associated with a second TRP) may provide coverage area 110-b. Additionally, each base station 105 may communicate with the UE 115-a over one or multiple communication links. For example, the first base station 105-a may transmit downlink communications to the UE 115-a via link 205, and the UE 115-a may transmit uplink communications to the first base station 105-a via link 210. In this example, the UE 115-a may also transmit uplink communications to the second base station 105-b via link 215. In some examples, the base stations 105 and the UE 115-a may communicate using particular directional beams that are identified based on one or more beam training procedures.

In some cases, in order to allow for more reliable uplink communications to both of the base stations 105 the UE 115-a may be configured with two SRS resource sets. The SRS resources from one or both of the SRS resource sets may be indicated by a resource indication (e.g., one or more SRI fields) transmitted to the UE 115-a in control information 225. In some cases, the UE 115-a may receive configuration information 220 that configures multiple SRS resource sets, and that configures a number of bits that are to be used to indicate whether one or multiple SRS resource sets are to be used and SRS resources within each SRS resource set. For example, the configuration information 220 may be RRC signaled configuration information. The resource indication may provide an indication of a first mode in which one SRS resource set is to be used for an associated first uplink transmission 230 to the first base station 105-a, and SRS resources within the one SRS resource set. Alternatively, the resource indication may provide an indication of a second mode in which multiple SRS resource sets are to be used for an associated first uplink transmission 230 to the first base station 105-a and second uplink transmission 235 to the second base station, along with the associated SRS resources within each SRS resource set.

In some cases, for dynamic indication of the first mode versus the second mode, by the control information 225 (e.g., DCI for non-codebook based PUSCH), the number of bits needed to indicate SRS resources within one (in the first mode) or two (in in the second mode) SRS resource sets that are associated with the PUSCH repetitions may be determined as: 1+max (X, Y). In some cases, one bit within the control information 225 is to indicate the first mode (one SRS resource set) versus the second mode (two SRS resource sets). For example, this bit can be the first bit of an SRI field of the control information 225, or can be a separate field. The value X is the number of bits that are needed to indicate one or more (up to $L_{max}$) SRS resources within one SRS resource set in case that the first mode is indicated, and the value of Y is the number of bits that are needed to indicate one or more (up to $L_{max}'$) SRS resources within the first SRS resource set plus the number of bits that are needed to indicate one or more (up to $L_{max}'$) SRS resources within the second SRS resource set in case that the second mode is indicated (where $L_{max}'<L_{max}$). In some cases, $L_{max}'$ may be a fixed value (e.g., $L_{max}'=1$ if only single layer transmission is allowed for the second mode), or can be RRC configured, which may be also a function of UE 115-$a$ capability signaling.

In some cases, the size of the control information 225 may be aligned such that a same number of bits are used for signaling both the first mode information and the second mode information. In some cases, for size alignment, if X>Y (i.e., max(X, Y)=X) and the second mode is indicated (i.e., Y bits are needed), then zero-padding may be used, and (X−Y) zeros may be appended or prepended to the indication field in the control information 225 (e.g., X−Y least significant bits or most significant bits are set to zero). Alternatively, if Y>X (i.e., max(X, Y)=Y) and the first mode is indicated (i.e., X bits are needed), the (Y−X) zeros may be appended or prepended to the indication field in the control information 225 (e.g., Y−X least significant bits or most significant bits are set to zero).

In some cases, assuming that the first SRS resource set is configured with $N_{SRS}^1$ SRS resources and the second SRS resource set is configured with $N_{SRS}^2$ SRS resources, the values X and Y may be determined as:

for X (number of bits to indicate one or more (up to $L_{max}$) SRS resources within one SRS resource set in case of the first mode):

Case 1: If the one SRS resource set is always the first SRS resource set, $$X = \left\lceil \log_2 \sum_{k=1}^{min(L_{max},N_{SRS}^1)} \binom{N_{SRS}^1}{k} \right\rceil.$$

Case 2: If the one SRS resource set can be either the first SRS resource set or the second SRS resource set, $$X = 1 + \left\lceil \log_2 \sum_{k=1}^{min(L_{max},max(N_{SRS}^1,N_{SRS}^2))} \binom{max(N_{SRS}^1, N_{SRS}^2)}{k} \right\rceil,$$

where the 1 bit is to indicate either the first SRS resource set or the second SRS resource set, and max ($N_{SRS}^1$, $N_{SRS}^2$) is because the maximum number needs to be considered if the SRS resource set with larger number of SRS resources is indicated.

for Y (the number of bits to indicate one or more (up to $L_{max}'$) SRS resources within the first SRS resource set plus the number of bits to indicate one or more (up to $L_{max}'$) SRS resources within the second SRS resource set in case of the second mode):

Case 1 (separate indication):

$$Y = \left\lceil \log_2 \sum_{k=1}^{min(L_{max}',N_{SRS}^1)} \binom{N_{SRS}^1}{k} \right\rceil + \left\lceil \log_2 \sum_{k=1}^{min(L_{max}',N_{SRS}^2)} \binom{N_{SRS}^2}{k} \right\rceil$$

Case 2 (joint indication assuming that actual number of layers, i.e., indicated number of SRS resources within each set, is the same for both sets of repetitions):

$$Y = \left\lceil \log_2 \sum_{k=1}^{min(L_{max}',N_{SRS}^1,N_{SRS}^2)} \binom{N_{SRS}^1}{k}\binom{N_{SRS}^2}{k} \right\rceil.$$

Alternatively, in some cases, a joint indication of one or two SRS resource sets along with indicated SRS resources of each SRS resource set may be provided. In such cases, for dynamic indication of the first mode versus the second mode (e.g., by the DCI for non-codebook based PUSCH) as well as for indication of SRS resources within one (in the first mode) or two (in the second mode) SRS resource sets that are associated with PUSCH repetitions, one SRI field may jointly coded to indicate one of the multiple possibilities, including:

Case 1 (one SRS resource set is always the first SRS resource set): The number of bits needed is:

$$\left\lceil \log_2\left(\sum_{k=1}^{min(L_{max},N_{SRS}^1)} \binom{N_{SRS}^1}{k} + \sum_{k=1}^{min(L_{max}',N_{SRS}^1,N_{SRS}^2)} \binom{N_{SRS}^1}{k}\binom{N_{SRS}^2}{k}\right) \right\rceil$$

where the first term $$\left(\text{i.e., } \log_2\left(\sum_{k=1}^{min(L_{max},N_{SRS}^1)} \binom{N_{SRS}^1}{k}\right)\right)$$

indicates the number of possibilities for the first mode to indicate SRS resources within the first SRS resource set, and the second term indicates the number of possibilities for the second mode to indicate SRS resources within both the first SRS resource set or the second SRS resource set, where the number of indicated SRS resources is the same (across first set and second set).

Case 2 (one SRS resource set can be either the first set or the second set): The number of bits needed is:

$$\left\lceil \log_2\left(\sum_{k=1}^{min(L_{max},N_{SRS}^1)} \binom{N_{SRS}^1}{k} + \right.\right.$$
$$\left.\left. \sum_{k=1}^{min(L_{max},N_{SRS}^2)} \binom{N_{SRS}^2}{k} + \sum_{k=1}^{min(L_{max}',N_{SRS}^1,N_{SRS}^2)} \binom{N_{SRS}^1}{k}\binom{N_{SRS}^2}{k}\right) \right\rceil$$

where the first two terms indicate the number of possibilities for the first mode to indicate SRS resources within either the first SRS resource set or the second SRS resource set, and the third term indicates the number of possibilities for the second mode to indicate SRS resources within both the first SRS resource set or the second SRS resource set, where the number of indicated SRS resources is the same (across first set and second set). Using such techniques, each codepoint of the joint fields is mapped to one of the possibilities of SRS resource sets to use and indicated SRS resources of each set.

For example, assume $N_{STS}^1=4$, $N_{SRS}^2=4$, $L_{max}=4$, $L_{max}'=1$. If separate SRI fields were simply transmitted, 8 bits are needed for two SRI fields each with 4 bits. In cases where joint coding is not used, assuming Case 2 for X and either Case1/Case2 (same result in this example) for Y, 6 bits are needed:

$$X = 1 + \left\lceil \log_2 \sum_{k=1}^{4} \binom{4}{k} \right\rceil = 1 + 4 = 5$$

$$Y = \left\lceil \log_2 \binom{4}{1} \right\rceil + \left\lceil \log_2 \binom{4}{1} \right\rceil = 4$$

$$\to 1 + \max(X, Y) = 1 + 5 = 6.$$

Assuming Case 1 for X and either Case1/Case2 (same result in this example) for Y, 5 bits are needed:

$$X = \left\lceil \log_2 \sum_{k=1}^{4} \binom{4}{k} \right\rceil = 4$$

In cases where joint coding is used, 6 bits are needed:

$$\left\lceil \log_2 \left( \sum_{k=1}^{4} \binom{4}{k} + \sum_{k=1}^{4} \binom{4}{k} + \binom{4}{1}\binom{4}{1} \right) \right\rceil = \lceil \log_2(15 + 15 + 16) \rceil = 6$$

Assuming Case 1: 5 bits are needed $$\left\lceil \log_2 \left( \sum_{k=1}^{4} \binom{4}{k} + \binom{4}{1}\binom{4}{1} \right) \right\rceil = \lceil \log_2(15 + 16) \rceil = 5.$$

In another example, assume $N_{SRS}^1=4$, $N_{SRS}^2=3$, $L_{max}=2$, $L_{max}'=1$. If separate SRI fields were simply transmitted, 7 bits are needed (two SRI fields, first one with 4 bits; second one with 3 bits). In cases where joint coding is not used, assuming Case2 (for both X and Y): 1+max(X, Y)=1+max(1+4,4)=6 bits are needed. In cases where joint coding is used, assuming Case2:

$$\left\lceil \log_2 \left( \sum_{k=1}^{2} \binom{4}{k} + \sum_{k=1}^{2} \binom{3}{k} + \binom{4}{1}\binom{3}{1} \right) \right\rceil = 5$$

bits are needed. Accordingly, using techniques as discussed herein, signaling overhead may be reduced relative to transmission is separate SRI fields for DCI transmissions.

Figure 3:
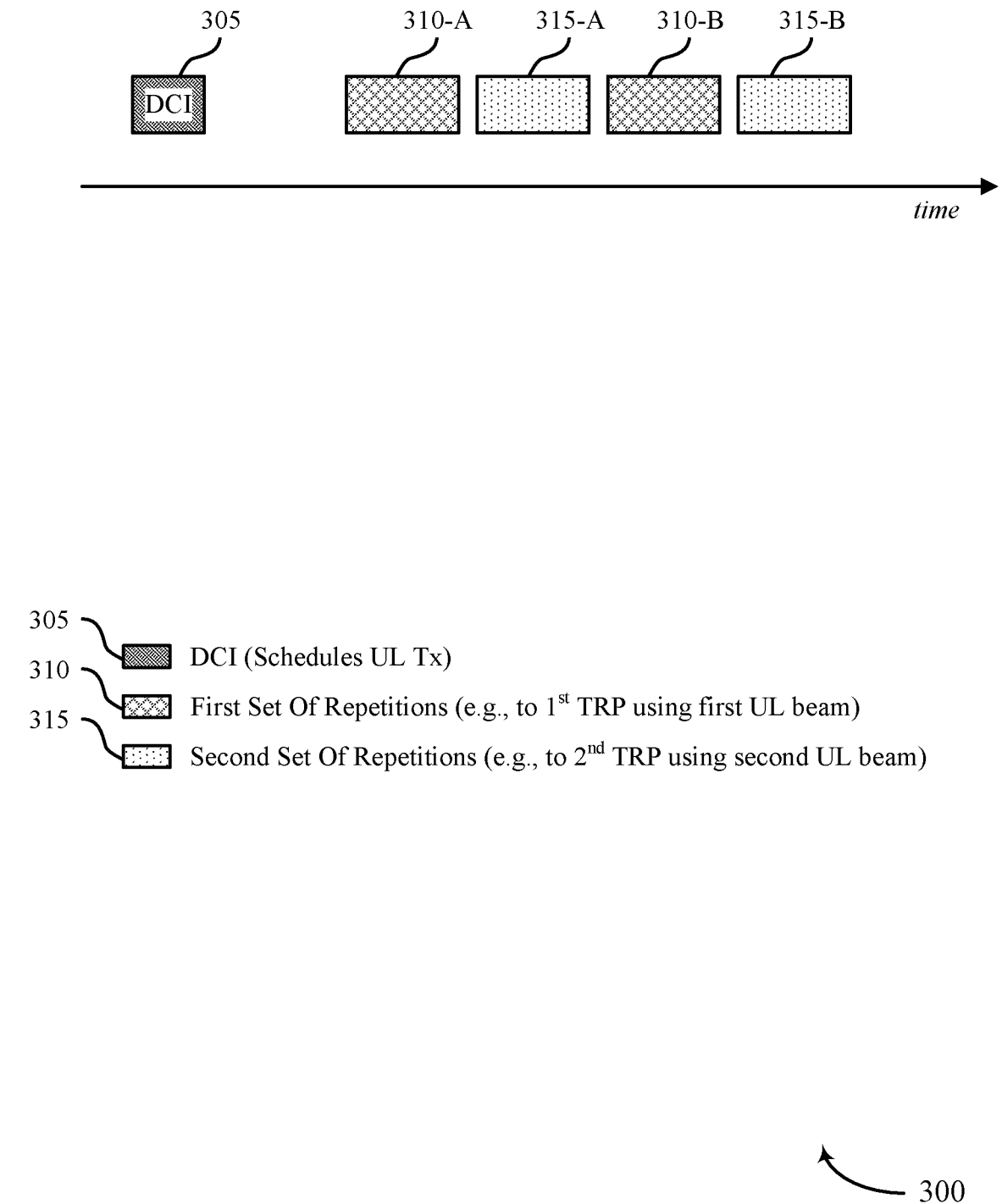
FIG. 3 illustrates an example of control and shared channel communications that support rank and resource set signaling techniques for multiple TRP communications in accordance with aspects of the present disclosure.

FIG. 3 illustrates an example of control and shared channel communications 300 that support rank and resource set signaling techniques for multiple TRP communications in accordance with aspects of the present disclosure. For example, control and shared channel communications 300 may be used in wireless communications systems that include UEs 115 and base stations 105 as described with reference to FIGS. 1 and 2. It is to be understood that references to specific wireless devices (e.g., UEs, TRPs, base stations) in the exemplary figures are provided for illustrative purposes, and different wireless devices not specifically referred to herein may be used interchangeably with those described herein. Likewise, the described operations performed by a UE 115 may, in some cases, be performed by a base station 105, and vice versa. In some examples, the base stations may be examples of, or include, one or more TRPs. Additionally or alternatively, the base stations may each be an example of an IAB node, a repeater node (e.g., configured with some retransmission capability), or the like. Further, the UEs may be examples of a CPE, a sidelink node, a repeater node, or the like.

In this example, a scheduling DCI 305 may schedule an uplink transmission that has a first set of repetitions 310 and a second set of repetitions 315. Further, the first set of repetitions 310 may include a first repetition 310-a and a second repetition 310-b that are both transmitted to a first TRP. Likewise, the second set of repetitions 315 may include a third repetition 315-a and a fourth repetition 315-b that are both transmitted to a second TRP. Each repetition of both the first set of repetitions 310 and the second set of repetitions 315 may include a same TB, and thus the multiple repetitions to the multiple different TRPs may enhance the likelihood of successful decoding of the TB at either or both of the first and second TRPs. As discussed herein, the scheduling DCI 305 may include a resource indication field that indicates whether one or two SRS resource sets are used, as well as SRS resource within each SRS resource set, as discussed with reference to FIG. 2.

Figure 4:
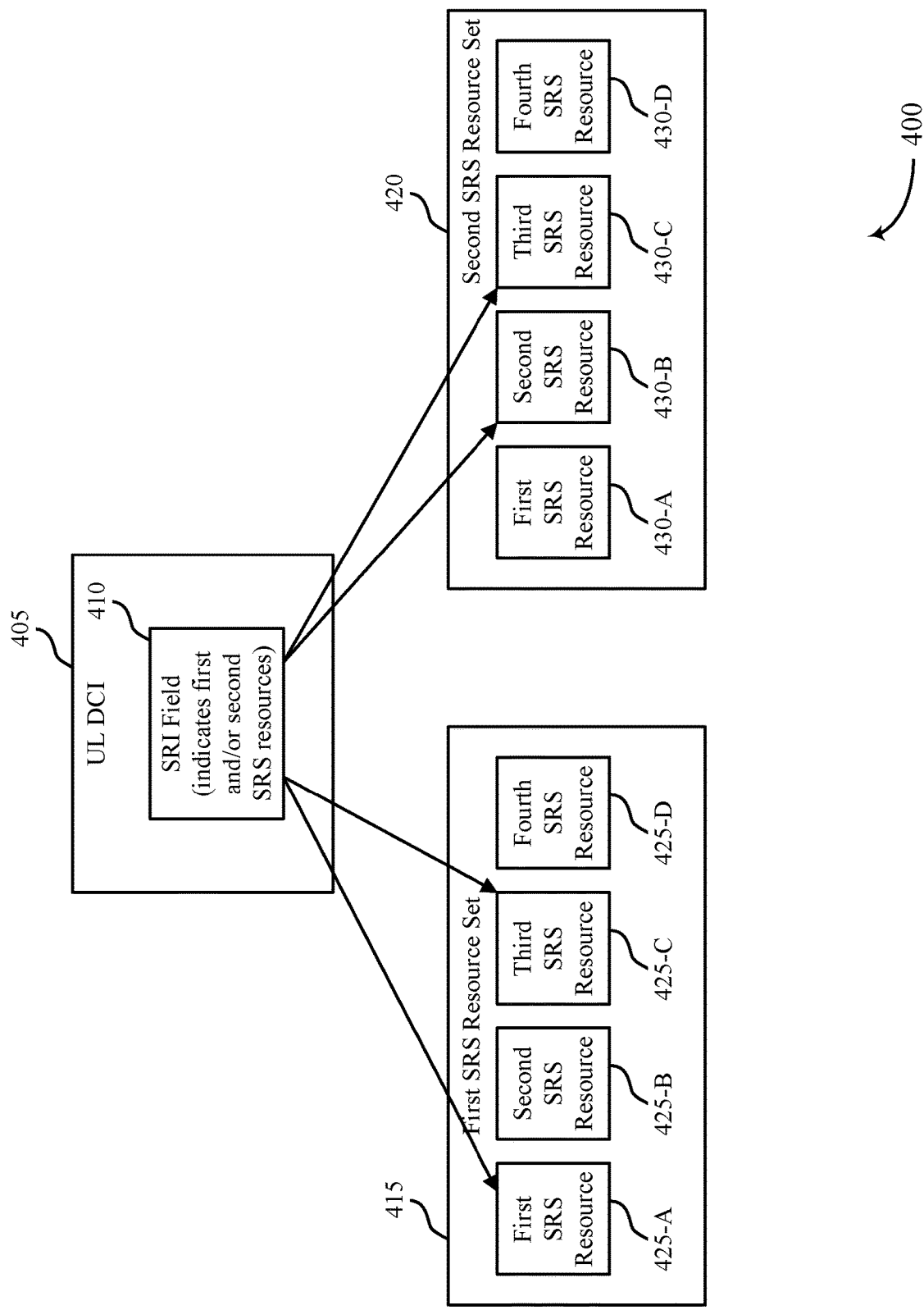
FIG. 4 illustrates an example of control information that supports rank and resource set signaling techniques for multiple TRP communications in accordance with aspects of the present disclosure.

FIG. 4 illustrates an example of control information 400 that supports rank and resource set signaling techniques for multiple TRP communications in accordance with aspects of the present disclosure. For example, the control information 400 may be used in wireless communications systems that include UEs 115 and base stations 105 as described herein.

In this example, an uplink DCI 405 may include scheduling information for an uplink PUSCH communication from a UE to one or multiple TRPs. In this example, the UE may be configured (e.g., via RRC signaling) with two SRS resource sets, including a first SRS resource set 415 and a second SRS resource set 420. Further, the UE may be configured to expect control information in a SRI field 410 that indicates whether one or both SRS resource sets are to be used for the associated uplink communication, and SRS resources within each indicated SRS resource set. In accordance with techniques provided herein, the uplink DCI 405 and the SRI field 410 may provide related SRS indications as discussed with reference to FIG. 2.

In this example, the first SRS resource set 415 may be configured with four SRS resources that include a first SRS resource 425-a, a second SRS resource 425-b, a third SRS resource 425-c, and a fourth SRS resource 425-d. Similarly, the second SRS resource set 420 may be configured with four SRS resources that include a first SRS resource 430-a, a second SRS resource 430-b, a third SRS resource 430-c, and a fourth SRS resource 430-d. The SRI field 410 in this example indicates (e.g., as discussed with reference to FIG. 2), within the first SRS resource set 415, the first SRS resource 425-a and the third SRS resource 425-c, and within the second SRS resource set 420, the second SRS resource 430-b and the third SRS resource 430-c. Thus, in this example, the uplink communication may be transmitted in a first repetition that uses uplink transmission parameters that are suitable for transmissions to a first TRP using a first beam and in a second repetition that uses uplink transmission parameters that are suitable for transmissions to a second TRP using a second beam.

Figure 5:
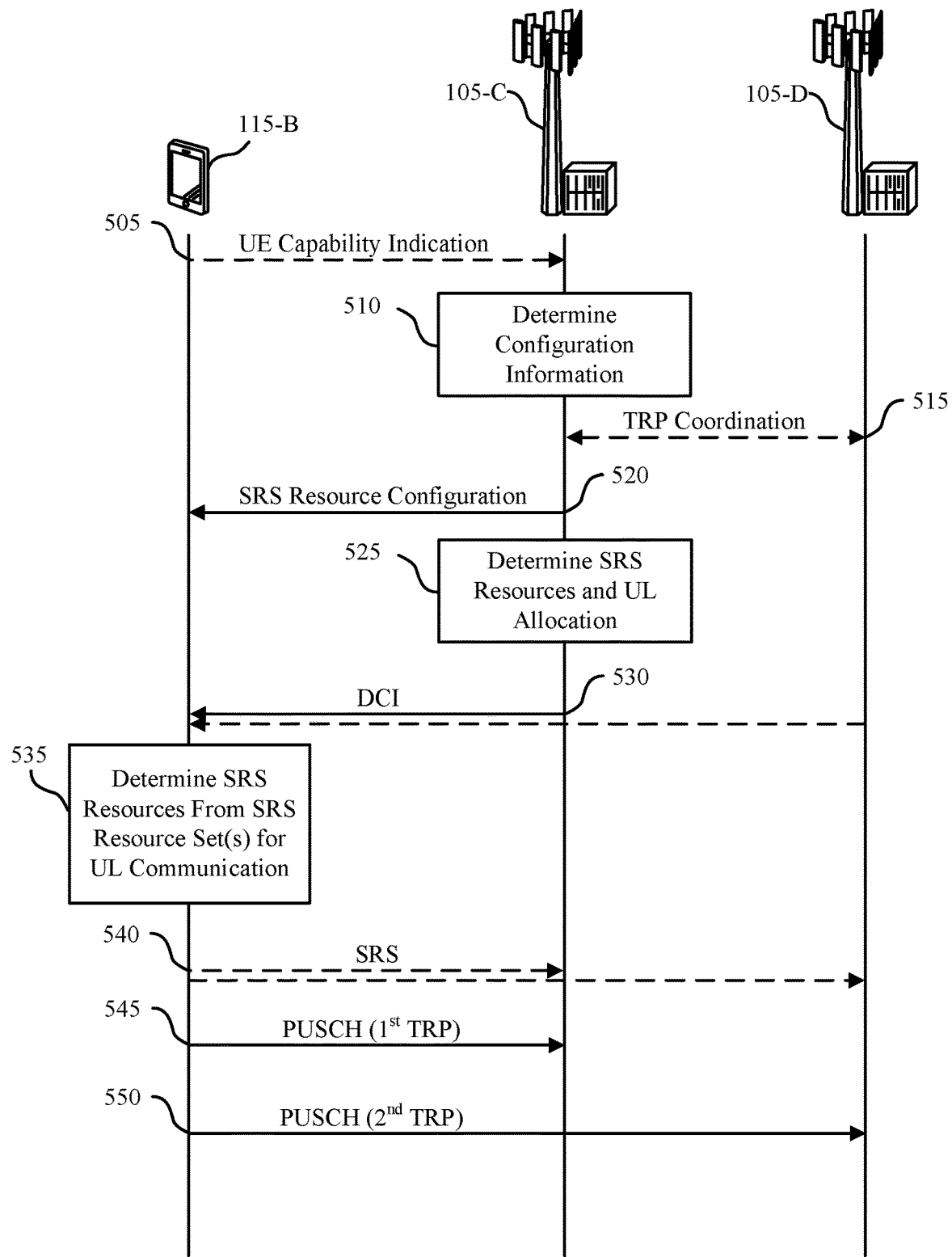
FIG. 5 illustrates an example of a process flow that supports rank and resource set signaling techniques for multiple TRP communications in accordance with aspects of the present disclosure.

FIG. 5 illustrates an example of a process flow 500 that supports rank and resource set signaling techniques for multiple TRP communications in accordance with aspects of the present disclosure. In some examples, the process flow 500 may implement aspects of wireless communications systems 100 or 200. For example, the process flow 500 includes a UE 115-b and base stations 105-c and 105-d that each may be examples of the corresponding devices described with reference to FIGS. 1-4. The process flow 500 may illustrate an example of the base stations 105-c and 105-d and the UE 115-b determining uplink transmission parameters (e.g., based on rank and SRS resources) for multiple repetitions of an uplink communication to different TRPs.

In the following description of the process flow 500, the operations between the UE 115-b and the base stations 105-c and 105-d may be transmitted in a different order than the order shown, or the operations performed by the base stations 105-c and 105-d and the UE 115-b may be performed in different orders or at different times. Certain operations may also be left out of the process flow 500, or other operations may be added to the process flow 500. It is to be understood that while base stations 105-c and 105-d and the UE 115-b are shown performing a number of the operations of process flow 500, any wireless device (e.g., a UE, a CPE, a base station, a transmission/reception point (TRP), an IAB node, a repeater with different types of capabilities in terms of repetition of signals (also known as "smart" or "dumb" repeaters, or some other terminology), or a sidelink node, among other examples) may perform the operations shown.

Optionally, at 505, the UE 115-b may transmit a capability indication to the first base station 105-c (e.g., which may include a first TRP). Such a capability indication may provide information related to whether the UE 115-b is capable of receiving control information and configuration information that provides for uplink transmissions to multiple TRPs using different uplink transmission parameters that are scheduled with a same scheduling DCI.

At 510, the first base station 105-c may determine configuration information for the UE 115-b. In some cases, the first base station 105-c may be a serving base station 105-c, and may determine that the UE 115-b is to transmit multiple repetitions of uplink communications. In some cases, the configuration information may include configuration of multiple SRS resource sets, which may each be associated with different TRPs (e.g., a first SRS resource set may provide SRS resources that are suitable for communications with one or multiple TRPs, and a second SRS resource set may provide SRS resources that are suitable for communications with one or multiple TRPs that may include some or none of the same TRPs as the first SRS resource set). The configuration information may also include an indication of a format (e.g., a number of bits) of control information that schedules uplink communications (e.g., such as discussed with reference to FIG. 2). Additionally, in some cases, the configuration information may also configure one of the SRS resource sets as being associated with a particular SRI field in control information. In some cases, the first base station 105-c may optionally exchange TRP coordination information with the second base station 105-d, as indicated at 515. Such coordination information may include information on uplink resources for expected uplink communications, for example.

At 520, the first base station 105-c may transmit SRS resource configuration to the UE 115-b. In some cases, the SRS resource configuration may be transmitted as part of RRC signaling between the UE 115-b and the first base station 105-c. At 525, the first base station 105-c may determine a repetition level, SRS resources, and an uplink allocation, for an uplink communication from the UE 115-b.

At 530, the first base station 105-c (and/or optionally the second base station 105-d) may transmit DCI to the UE 115-b. The DCI may include an indication (e.g., as discussed with reference to FIG. 2) of whether one or two SRS resource set(s) are to be used for an uplink communication, a number of repetitions of the uplink communication, an indication of one or more SRS resources within the one or more SRS resource sets that are associate with the uplink communication, or any combinations thereof.

At 535, the UE 115-b may determine (e.g., as discussed with reference to FIG. 2) uplink transmission parameters for repetitions of the uplink communication. In some cases, the UE 115-b may determine which SRS resource of the configured SRS resource sets are to be associated with the uplink communication, such as by using one or more techniques as discussed herein.

Optionally, at 540, the UE 115-b may transmit one or more SRSs to the first base station 105-c and/or the second base station 105-d. The one or more SRSs may have uplink transmission parameters that are determined based on the indicated SRS resources, as discussed herein. At 545, the UE 115-b may transmit a first PUSCH to the first base station 105-c, and at 550 the UE 115-b may transmit a second PUSCH to the second base station 105-d. The repetitions of the PUSCH may have uplink transmission parameters that are determined based on the indicated SRS resources, such as by using various different techniques as provided herein.

Figure 6:
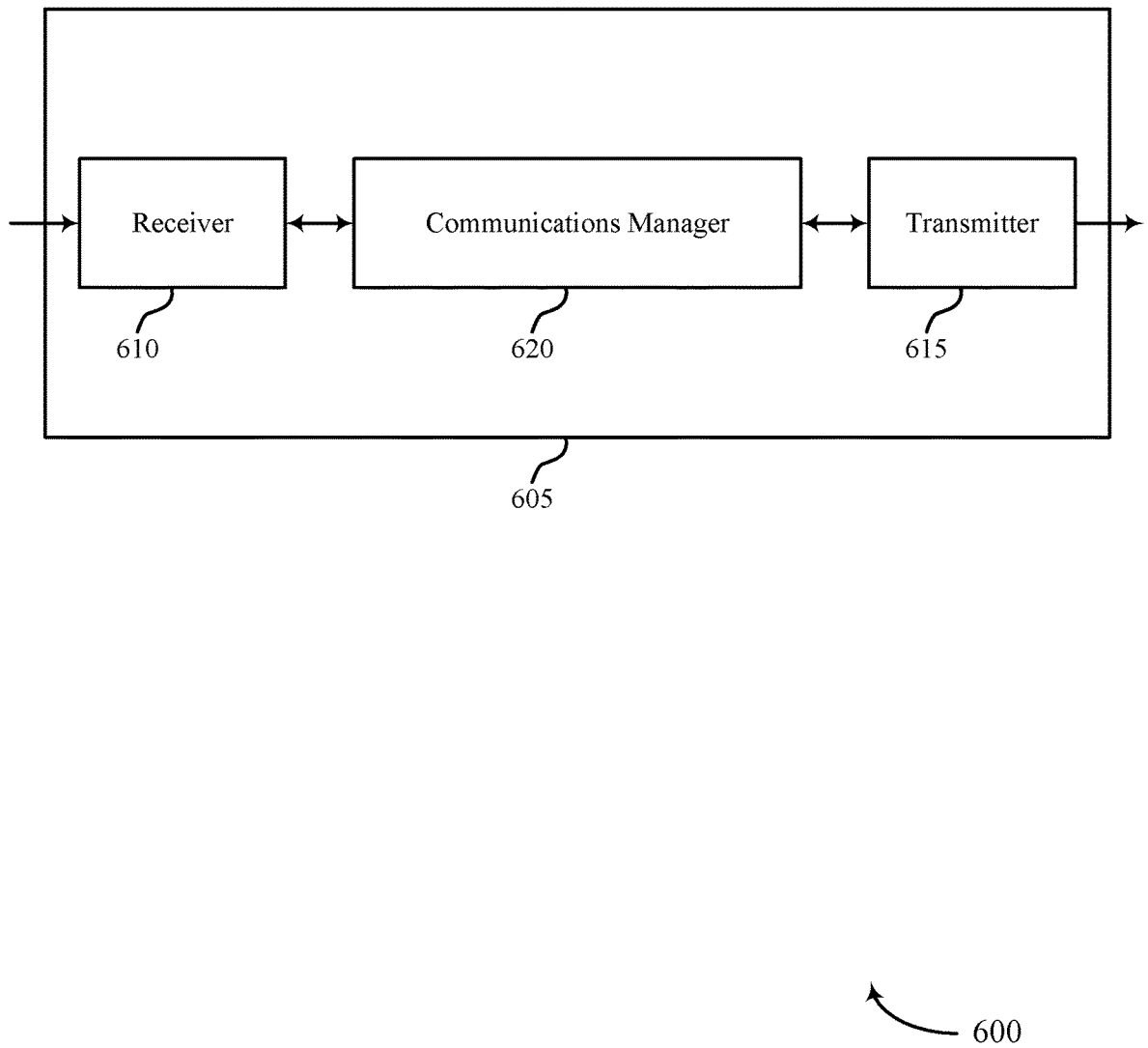
FIGS. 6 and 7 show block diagrams of devices that support rank and resource set signaling techniques for multiple TRP communications in accordance with aspects of the present disclosure.

FIG. 6 shows a block diagram 600 of a device 605 that supports rank and resource set signaling techniques for multiple TRP communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to rank and resource set signaling techniques for multiple TRP communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to rank and resource set signaling techniques for multiple TRP communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of rank and resource set signaling techniques for multiple TRP communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 (e.g., a UE 115) in accordance with examples as disclosed herein. For example, the communications manager 620 may be configured as or otherwise support a means for receiving, from a base station, a control information configuration that indicates a quantity of bits that are to be included in a control information field that indicates one or two SRS resource sets with which a first uplink communication is to be associated. The communications manager 620 may be configured as or otherwise support a means for receiving, from the base station, a first control information communication that includes the control information field and that schedules the first uplink communication for the device 605. The communications manager 620 may be configured as or otherwise support a means for determining, based on the first control information communication and the control information configuration, whether one or two SRS resource sets are associated with the first uplink communication. The communications manager 620 may be configured as or otherwise support a means for transmitting the first uplink communication to the base station based on the determining.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for transmitting multiple repetitions of an uplink communication to multiple different TRPs, such that the different repetitions may use transmission parameters that are suitable for the particular TRP associated with the repetition. Such techniques may allow for enhanced reliability of wireless communications, and thus provide more efficient utilization of communication resources, reduced power consumption (through reduced retransmissions), reduced latency (through reduced retransmission), and more efficient utilization of communication resources.

Figure 7:
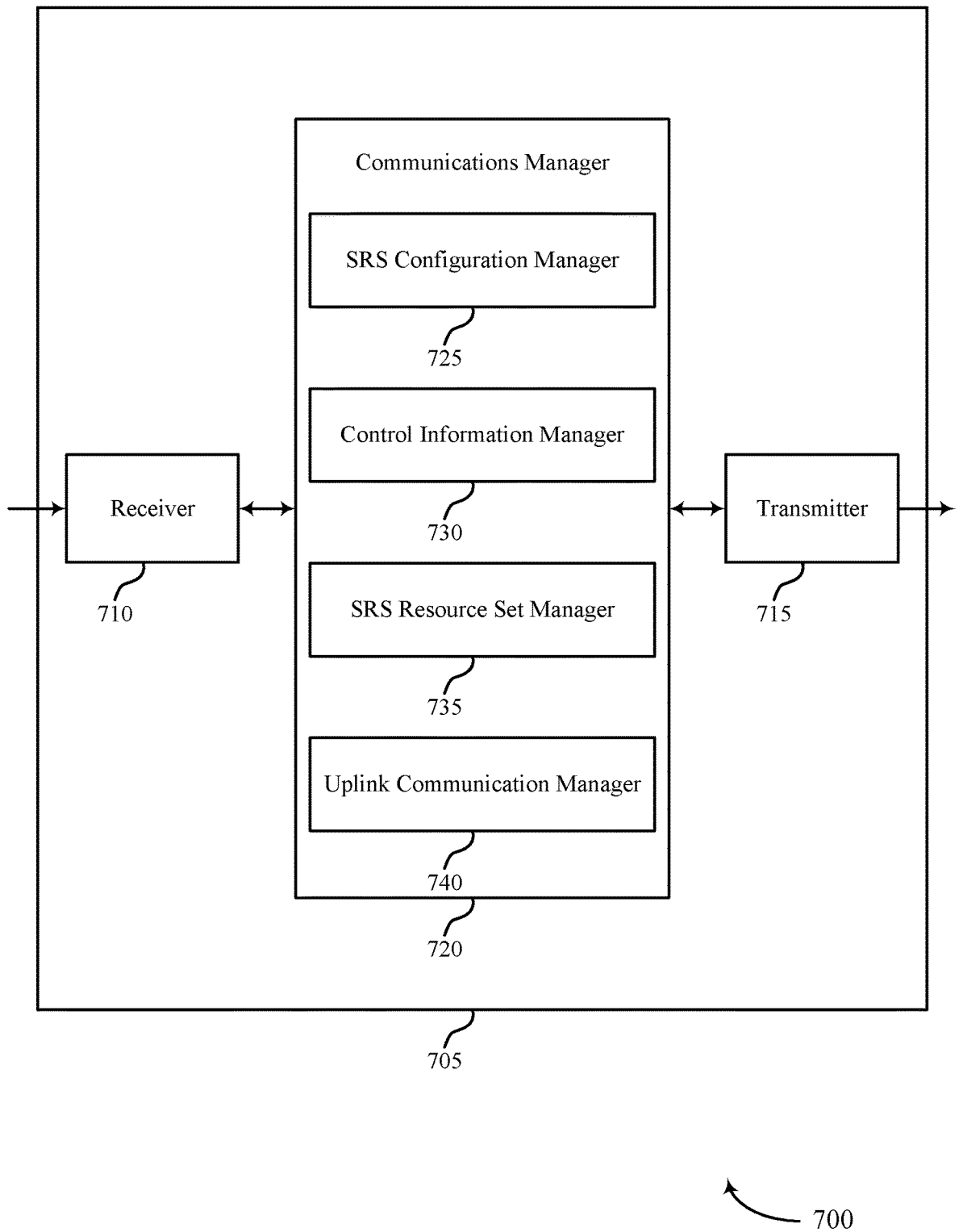

FIG. 7 shows a block diagram 700 of a device 705 that supports rank and resource set signaling techniques for multiple TRP communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to rank and resource set signaling techniques for multiple TRP communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to rank and resource set signaling techniques for multiple TRP communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of rank and resource set signaling techniques for multiple TRP communications as described herein. For example, the communications manager 720 may include an SRS configuration manager 725, a control information manager 730, an SRS resource set manager 735, an uplink communication manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at the device 705 (e.g., a UE 115) in accordance with examples as disclosed herein. The SRS configuration manager 725 may be configured as or otherwise support a means for receiving, from a base station, a control information configuration that indicates a quantity of bits that are to be included in a control information field that indicates one or two SRS resource sets with which a first uplink communication is to be associated. The control information manager 730 may be configured as or otherwise support a means for receiving, from the base station, a first control information communication that includes the control information field and that schedules the first uplink communication for the device 705. The SRS resource set manager 735 may be configured as or otherwise support a means for determining, based on the first control information communication and the control information configuration, whether one or two SRS resource sets are associated with the first uplink communication. The uplink communication manager 740 may be configured as or otherwise support a means for transmitting the first uplink communication to the base station based on the determining.

Figure 8:
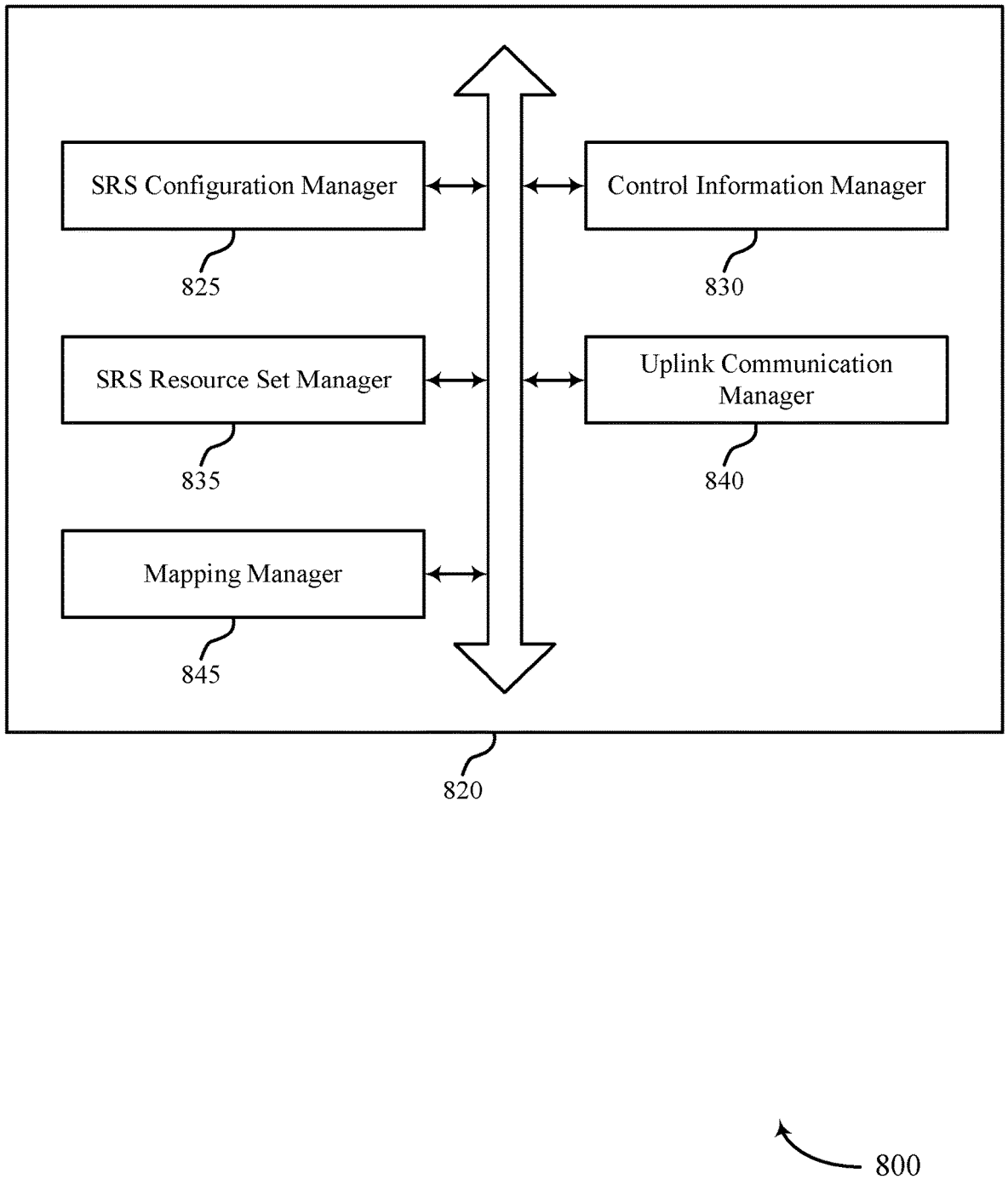
FIG. 8 shows a block diagram of a communications manager that supports rank and resource set signaling techniques for multiple TRP communications in accordance with aspects of the present disclosure.

FIG. 8 shows a block diagram 800 of a communications manager 820 that supports rank and resource set signaling techniques for multiple TRP communications in accordance with aspects of the present disclosure. The communications manager 820 may be an example of aspects of a communications manager 620, a communications manager 720, or both, as described herein. The communications manager 820, or various components thereof, may be an example of means for performing various aspects of rank and resource set signaling techniques for multiple TRP communications as described herein. For example, the communications manager 820 may include an SRS configuration manager 825, a control information manager 830, an SRS resource set manager 835, an uplink communication manager 840, a mapping manager 845, or any combination thereof. Each of these components may communicate, directly or indirectly, with one another (e.g., via one or more buses).

The communications manager 820 may support wireless communication at the device 805 (e.g., a UE 115) in accordance with examples as disclosed herein. The SRS configuration manager 825 may be configured as or otherwise support a means for receiving, from a base station, a control information configuration that indicates a quantity of bits that are to be included in a control information field that indicates one or two SRS resource sets with which a first uplink communication is to be associated. The control information manager 830 may be configured as or otherwise support a means for receiving, from the base station, a first control information communication that includes the control information field and that schedules the first uplink communication for the device 805. The SRS resource set manager 835 may be configured as or otherwise support a means for determining, based on the first control information communication and the control information configuration, whether one or two SRS resource sets are associated with the first uplink communication. The uplink communication manager 840 may be configured as or otherwise support a means for transmitting the first uplink communication to the base station based on the determining.

In some examples, to support determining, the SRS resource set manager 835 may be configured as or otherwise support a means for determining, based on the first control information communication and the control information configuration, the number of SRS resources for each SRS resource set associated with the first uplink communication.

In some examples, to support determining, the control information manager 830 may be configured as or otherwise support a means for determining, based on a first bit of the first control information communication, whether one or two SRS resource sets are associated with the first uplink communication, and where the control information field includes a set of bits that indicate a number of SRS resources for each SRS resource set associated with the first uplink communication. In some examples, the first bit is an initial bit of the control information field, or is in a separate field in the first control information communication. In some examples, the set of bits includes a maximum of a first number of bits or a second number of bits, the first number of bits determined based on a first maximum rank when one SRS resource set is associated with the first uplink communication, and the second number of bits determined based on a second maximum rank when two SRS resource sets are associated with the first uplink communication. In some examples, the second maximum rank is less than the first maximum rank. In some examples, the second maximum rank is a fixed value or a configured value that is provided with the control information configuration. In some examples, the configured value of the second maximum rank is based on a capability of the device 805 that is transmitted to the base station. In some examples, zero-padding is used in the set of bits when a number of bits necessary to indicate the rank of the one or two SRS resource sets is less than a total number of bits of the set of bits.

In some examples, the first number of bits is determined based on the first SRS resource set having a different number of SRS resources than the second SRS resource set. In some examples, the first number of bits is associated with the first SRS resource set. In some examples, the first number of bits is associated with either the first SRS resource set or the second SRS resource set, and a separate bit in the control information field provides an indication of which of the first SRS resource set or the second SRS resource set is associated with the first uplink communication. In some examples, the second number of bits is associated with both the first SRS resource set and the second SRS resource set, and a first subset of the second number of bits indicates one or more SRS resources within the first SRS resource set and a second subset of the second number of bits indicates one or more SRS resources within the second SRS resource set. In some examples, the second number of bits is associated with both the first SRS resource set and the second SRS resource set, and provides a joint indication of one or more SRS resources within each of the SRS resource sets based on a same number of layers associated with each SRS resource set.

In some examples, to support determining, the mapping manager 845 may be configured as or otherwise support a means for decoding the control information field to identify a set of bits. In some examples, to support determining, the mapping manager 845 may be configured as or otherwise support a means for identifying, based on a mapping for the set of bits, a number of SRS resources for each SRS resource set associated with the first uplink communication.

In some examples, a first SRS resource set is ordered ahead of a second SRS resource set, and the quantity of bits that are included in the control information field is determined as a sum of a first number of possibilities to indicate a first number of SRS resources associated with the first SRS resource set when a single SRS resource set is associated with the first uplink communication, and a second number of possibilities to indicate a second number of SRS resources associated with both the first and the second SRS resource set when both the first SRS resource set and the second SRS resource set are associated with the first uplink communication.

In some examples, a first SRS resource set or a second SRS resource set is ordered as an initial SRS resource set. In some examples, where the quantity of bits that are included in the control information field is determined as a sum of a first number of possibilities to indicate a first number of SRS resources associated with the initial SRS resource set when a single SRS resource set is associated with the first uplink communication, and a second number of possibilities to indicate a second number of SRS resources associated with both the first and the second SRS resource set when a both the first SRS resource set and the second SRS resource set are associated with the first uplink communication. In some examples, different bit values of the control information field are mapped to different possibilities of a number of the SRS resources that are associated with the first uplink communication.

Figure 9:
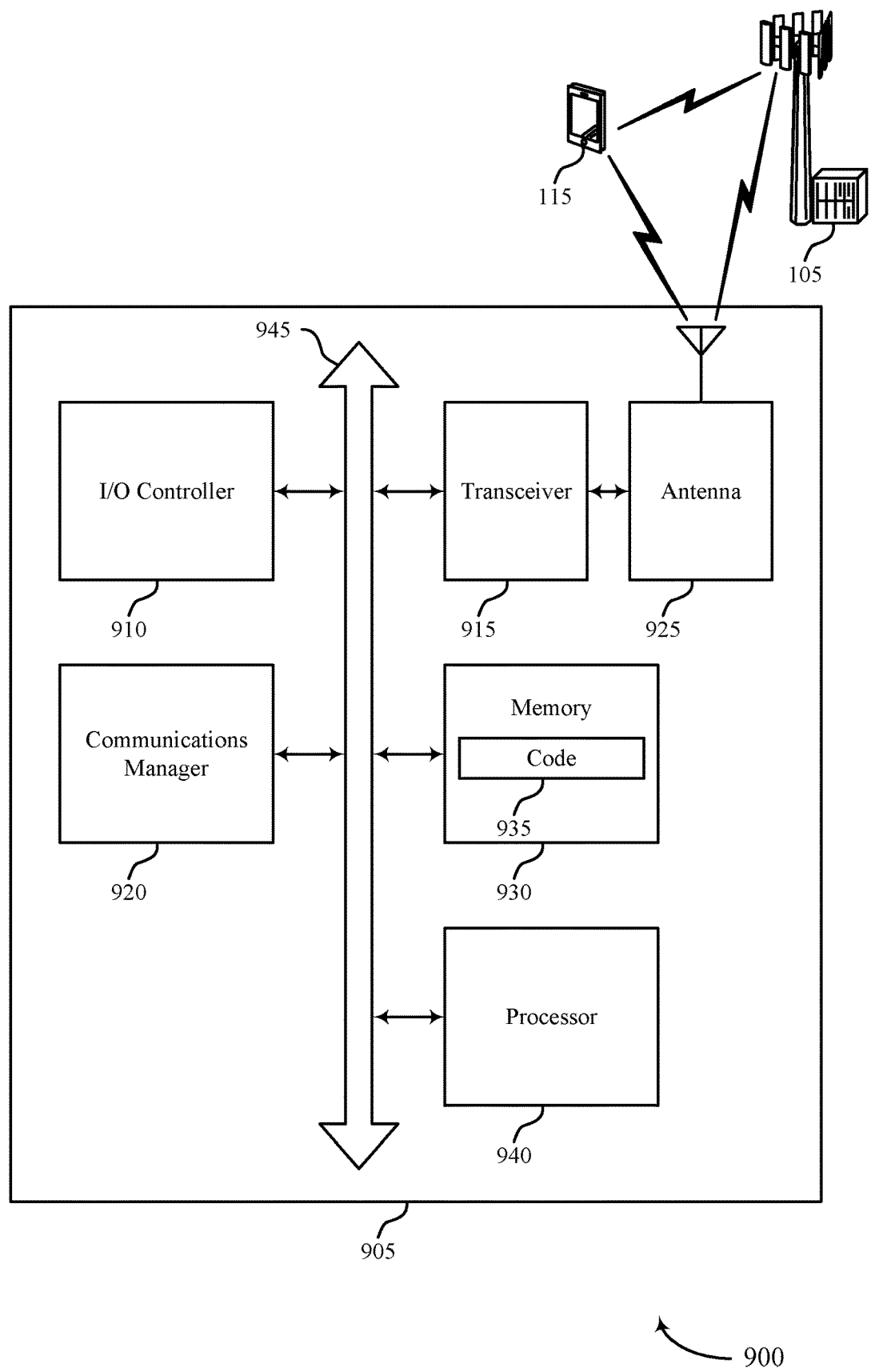
FIG. 9 shows a diagram of a system including a device that supports rank and resource set signaling techniques for multiple TRP communications in accordance with aspects of the present disclosure.

FIG. 9 shows a diagram of a system 900 including a device 905 that supports rank and resource set signaling techniques for multiple TRP communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting rank and resource set signaling techniques for multiple TRP communications). For example, the device 905 or a component of the device 905 may include a processor 940 and memory 930 coupled to the processor 940, the processor 940 and memory 930 configured to perform various functions described herein.

The communications manager 920 may support wireless communication at the device 905 (e.g., a UE 115) in accordance with examples as disclosed herein. For example, the communications manager 920 may be configured as or otherwise support a means for receiving, from a base station, a control information configuration that indicates a quantity of bits that are to be included in a control information field that indicates one or two SRS resource sets with which a first uplink communication is to be associated. The communications manager 920 may be configured as or otherwise support a means for receiving, from the base station, a first control information communication that includes the control information field and that schedules the first uplink communication for the device 905. The communications manager 920 may be configured as or otherwise support a means for determining, based on the first control information communication and the control information configuration, whether one or two SRS resource sets are associated with the first uplink communication. The communications manager 920 may be configured as or otherwise support a means for transmitting the first uplink communication to the base station based on the determining.

By including or configuring the communications manager 920 in accordance with examples as described herein, the device 905 may support techniques for transmitting multiple repetitions of an uplink communication to multiple different TRPs, such that the different repetitions may use transmission parameters that are suitable for the particular TRP associated with the repetition. Such techniques may allow for enhanced reliability of wireless communications, and thus provide more efficient utilization of communication resources, reduced power consumption (through reduced retransmissions), reduced latency (through reduced retransmission), and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of rank and resource set signaling techniques for multiple TRP communications as described herein, or the processor 940 and the memory 930 may be otherwise configured to perform or support such operations.

Figure 10:
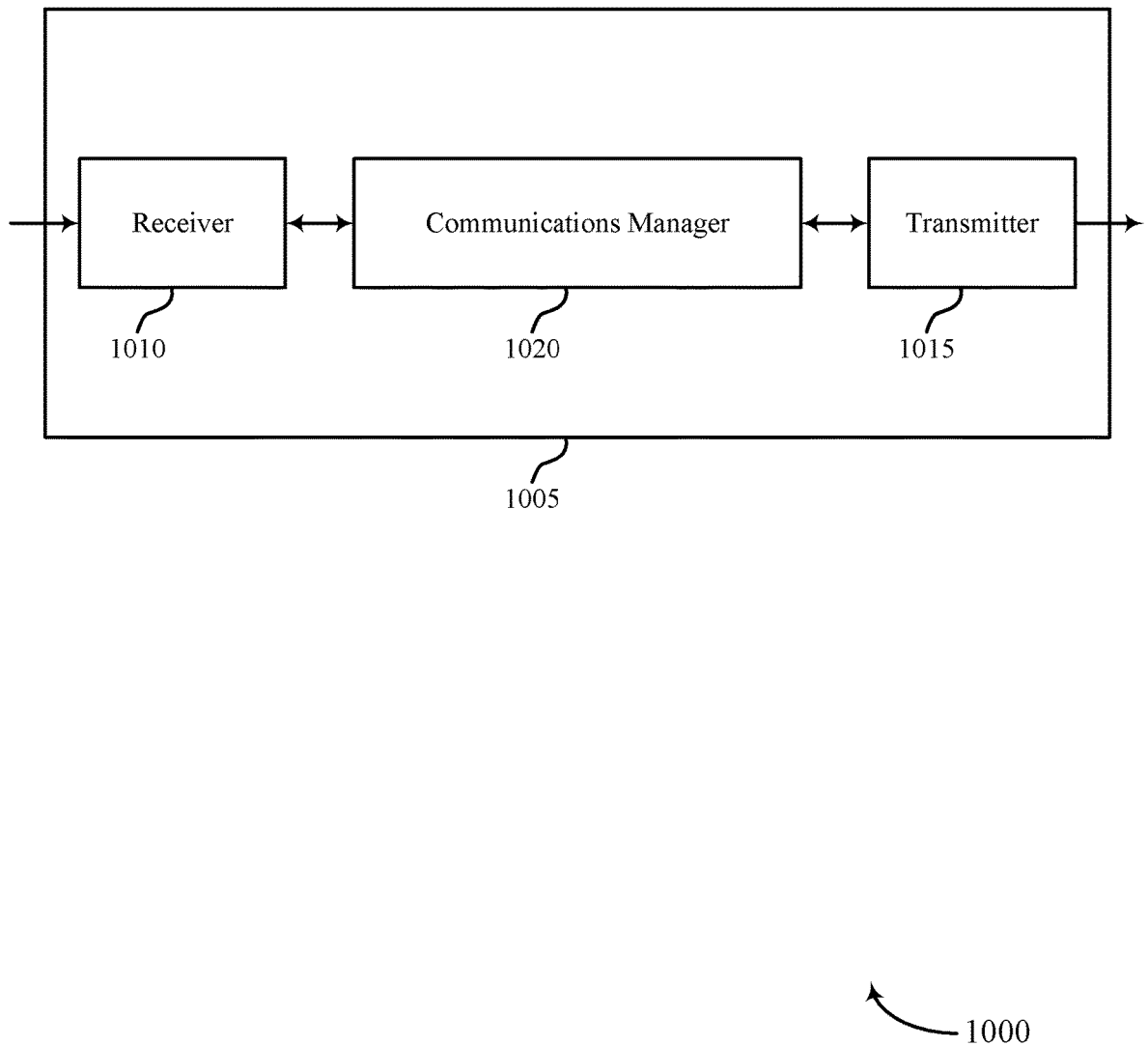
FIGS. 10 and 11 show block diagrams of devices that support rank and resource set signaling techniques for multiple TRP communications in accordance with aspects of the present disclosure.

FIG. 10 shows a block diagram 1000 of a device 1005 that supports rank and resource set signaling techniques for multiple TRP communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to rank and resource set signaling techniques for multiple TRP communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to rank and resource set signaling techniques for multiple TRP communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of rank and resource set signaling techniques for multiple TRP communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 (e.g., a base station 105) in accordance with examples as disclosed herein. For example, the communications manager 1020 may be configured as or otherwise support a means for transmitting, to a UE, a control information configuration that indicates a quantity of bits that are to be included in a control information field that indicates one or two SRS resource sets with which a first uplink communication is to be associated. The communications manager 1020 may be configured as or otherwise support a means for determining whether one SRS resource set or two SRS resource sets are associated with the first uplink communication. The communications manager 1020 may be configured as or otherwise support a means for transmitting, to the UE, a first control information communication that includes the control information field and that schedules the first uplink communication for the UE and indicates whether one SRS resource set or two SRS resource sets are associated with the first uplink communication. The communications manager 1020 may be configured as or otherwise support a means for receiving the first uplink communication from the UE based on the first control information communication.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for configuring UEs for transmission of multiple repetitions of an uplink communication to multiple different TRPs, such that the different repetitions may use transmission parameters that are suitable for the particular TRP associated with the repetition. Such techniques may allow for enhanced reliability of wireless communications, and thus provide more efficient utilization of communication resources, reduced power consumption (through reduced retransmissions), reduced latency (through reduced retransmission), and more efficient utilization of communication resources. Further, such techniques provide for flexibility in scheduling uplink communications with repetitions based on one or multiple SRS resource sets, which can enhance network efficiency through efficient scheduling of uplink communications in accordance with available network and wireless resources, and using reduced DCI overhead.

Figure 11:
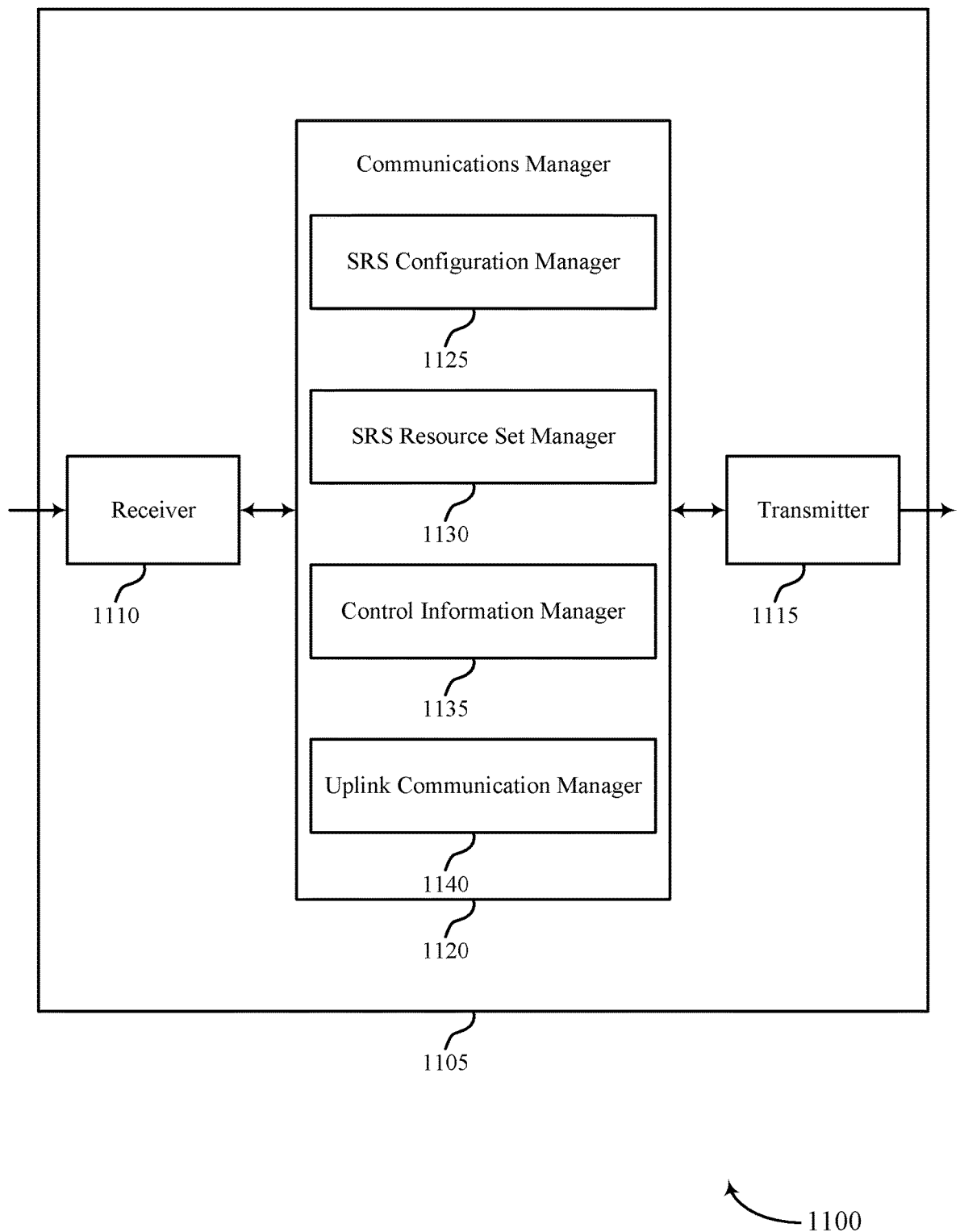

FIG. 11 shows a block diagram 1100 of a device 1105 that supports rank and resource set signaling techniques for multiple TRP communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to rank and resource set signaling techniques for multiple TRP communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to rank and resource set signaling techniques for multiple TRP communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of rank and resource set signaling techniques for multiple TRP communications as described herein. For example, the communications manager 1120 may include an SRS configuration manager 1125, an SRS resource set manager 1130, a control information manager 1135, an uplink communication manager 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 (e.g., a base station 105) in accordance with examples as disclosed herein. The SRS configuration manager 1125 may be configured as or otherwise support a means for transmitting, to a UE, a control information configuration that indicates a quantity of bits that are to be included in a control information field that indicates one or two SRS resource sets with which a first uplink communication is to be associated. The SRS resource set manager 1130 may be configured as or otherwise support a means for determining whether one SRS resource set or two SRS resource sets are associated with the first uplink communication. The control information manager 1135 may be configured as or otherwise support a means for transmitting, to the UE, a first control information communication that includes the control information field and that schedules the first uplink communication for the UE and indicates whether one SRS resource set or two SRS resource sets are associated with the first uplink communication. The uplink communication manager 1140 may be configured as or otherwise support a means for receiving the first uplink communication from the UE based on the first control information communication.

Figure 12:
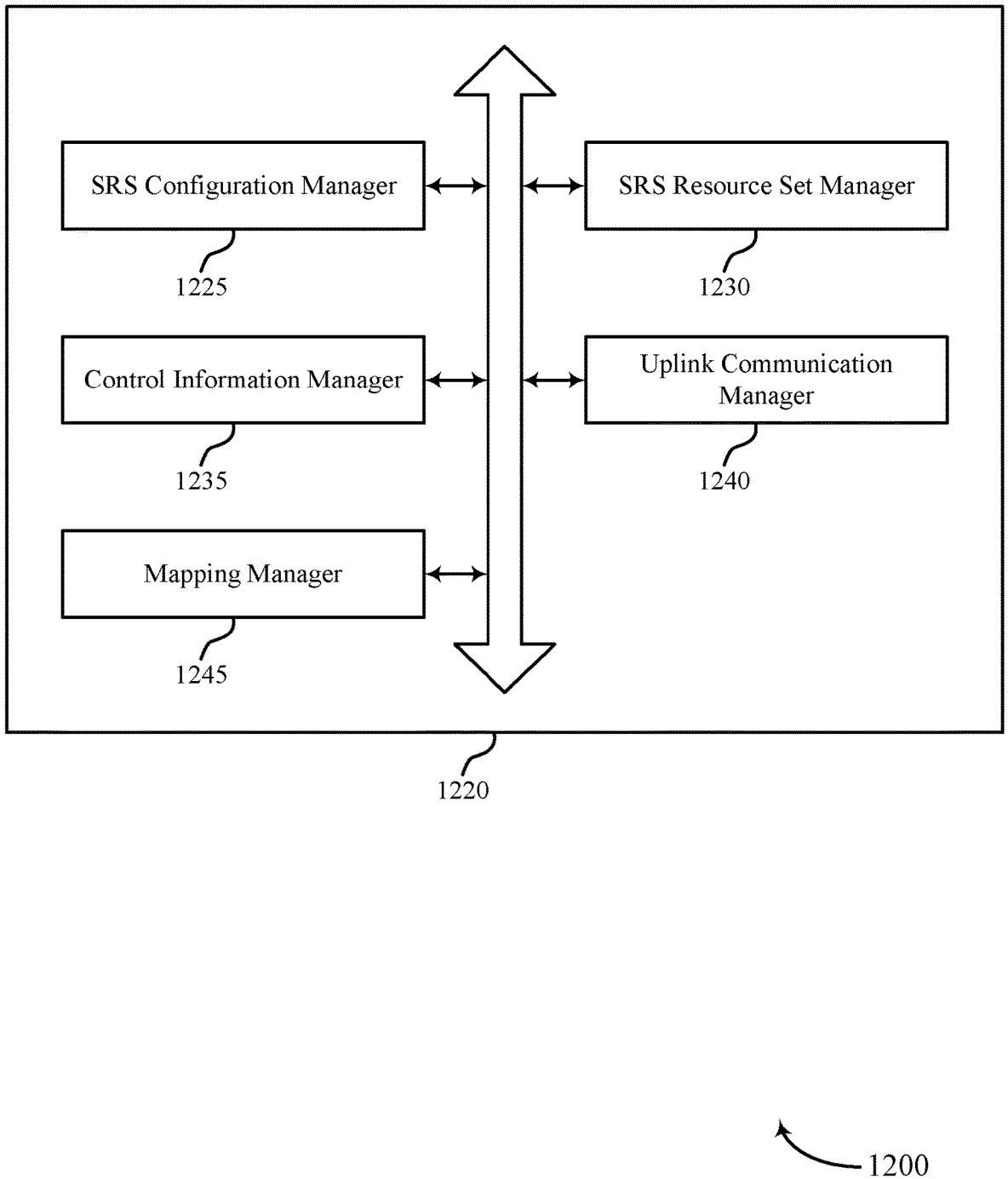
FIG. 12 shows a block diagram of a communications manager that supports rank and resource set signaling techniques for multiple TRP communications in accordance with aspects of the present disclosure.

FIG. 12 shows a block diagram 1200 of a communications manager 1220 that supports rank and resource set signaling techniques for multiple TRP communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of rank and resource set signaling techniques for multiple TRP communications as described herein. For example, the communications manager 1220 may include an SRS configuration manager 1225, an SRS resource set manager 1230, a control information manager 1235, an uplink communication manager 1240, a mapping manager 1245, or any combination thereof. Each of these components may communicate, directly or indirectly, with one another (e.g., via one or more buses).

The communications manager 1220 may support wireless communication at the device 1205 (e.g., a base station 105) in accordance with examples as disclosed herein. The SRS configuration manager 1225 may be configured as or otherwise support a means for transmitting, to a UE, a control information configuration that indicates a quantity of bits that are to be included in a control information field that indicates one or two SRS resource sets with which a first uplink communication is to be associated. The SRS resource set manager 1230 may be configured as or otherwise support a means for determining whether one SRS resource set or two SRS resource sets are associated with the first uplink communication. The control information manager 1235 may be configured as or otherwise support a means for transmitting, to the UE, a first control information communication that includes the control information field and that schedules the first uplink communication for the UE and indicates whether one SRS resource set or two SRS resource sets are associated with the first uplink communication. The uplink communication manager 1240 may be configured as or otherwise support a means for receiving the first uplink communication from the UE based on the first control information communication.

In some examples, the control information field further indicates a number of SRS resources to be associated with the first uplink communication. In some examples, a first bit of the first control information communication indicates whether one or two SRS resource sets are associated with the first uplink communication, and where the control information field includes a set of bits that indicate a number of SRS resources for each SRS resource set associated with the first uplink communication. In some examples, the first bit is an initial bit of the control information field, or is in a separate field in the first control information communication. In some examples, the set of bits includes a maximum of a first number of bits or a second number of bits, the first number of bits determined based on a first maximum rank when one SRS resource set is associated with the first uplink communication, and the second number of bits determined based on a second maximum rank set when two SRS resource sets are associated with the first uplink communication. In some examples, the second maximum rank is less than the first maximum rank. In some examples, the second maximum rank is a fixed value or a configured value that is provided with the control information configuration. In some examples, the configured value of the second maximum rank is based on a capability of the UE that is transmitted to the device 1205. In some examples, zero-padding is used in the set of bits when a number of bits necessary to indicate the rank of the one or two SRS resource sets is less than a total number of bits of the set of bits.

In some examples, the first number of bits is determined based on the first SRS resource set having a different number of SRS resources than the second SRS resource set. In some examples, the first number of bits is associated with the first SRS resource set.

In some examples, the first number of bits is associated with either the first SRS resource set or the second SRS resource set, and a separate bit in the control information field provides an indication of which of the first SRS resource set or the second SRS resource set is associated with the first uplink communication. In some examples, the second number of bits is associated with both the first SRS resource set and the second SRS resource set, and a first subset of the second number of bits indicates one or more SRS resources within the first SRS resource set and a second subset of the second number of bits indicates one or more SRS resources within the second SRS resource set. In some examples, the second number of bits is associated with both the first SRS resource set and the second SRS resource set, and provides a joint indication of one or more SRS resources within each of the SRS resource sets based on a same number of layers associated with each SRS resource set.

In some examples, the mapping manager 1245 may be configured as or otherwise support a means for determining a number of SRS resources for each SRS resource set associated with the first uplink communication. In some examples, the mapping manager 1245 may be configured as or otherwise support a means for identifying a mapping between a codepoint and the determined number of SRS resources. In some examples, the mapping manager 1245 may be configured as or otherwise support a means for where the control information field indicates the codepoint.

In some examples, different bit values of the control information field are mapped to different possibilities of the SRS resources that are associated with the first uplink communication. In some examples, a first SRS resource set is ordered ahead of a second SRS resource set, and the quantity of bits that are included in the control information field is determined as a sum of a first number of possibilities to indicate a first number of SRS resources associated with the first SRS resource set when a single SRS resource set is associated with the first uplink communication, and a second number of possibilities to indicate a second number of SRS resources associated with both the first and the second SRS resource set when both the first SRS resource set and the second SRS resource set are associated with the first uplink communication. In some examples, a first SRS resource set or a second SRS resource set is ordered as an initial SRS resource set. In some examples, where the quantity of bits that are included in the control information field is determined as a sum of a first number of possibilities to indicate a first number of SRS resources associated with the initial SRS resource set when a single SRS resource set is associated with the first uplink communication, and a second number of possibilities to indicate a second number of SRS resources associated with both the first and the second SRS resource set when a both the first SRS resource set and the second SRS resource set are associated with the first uplink communication.

Figure 13:
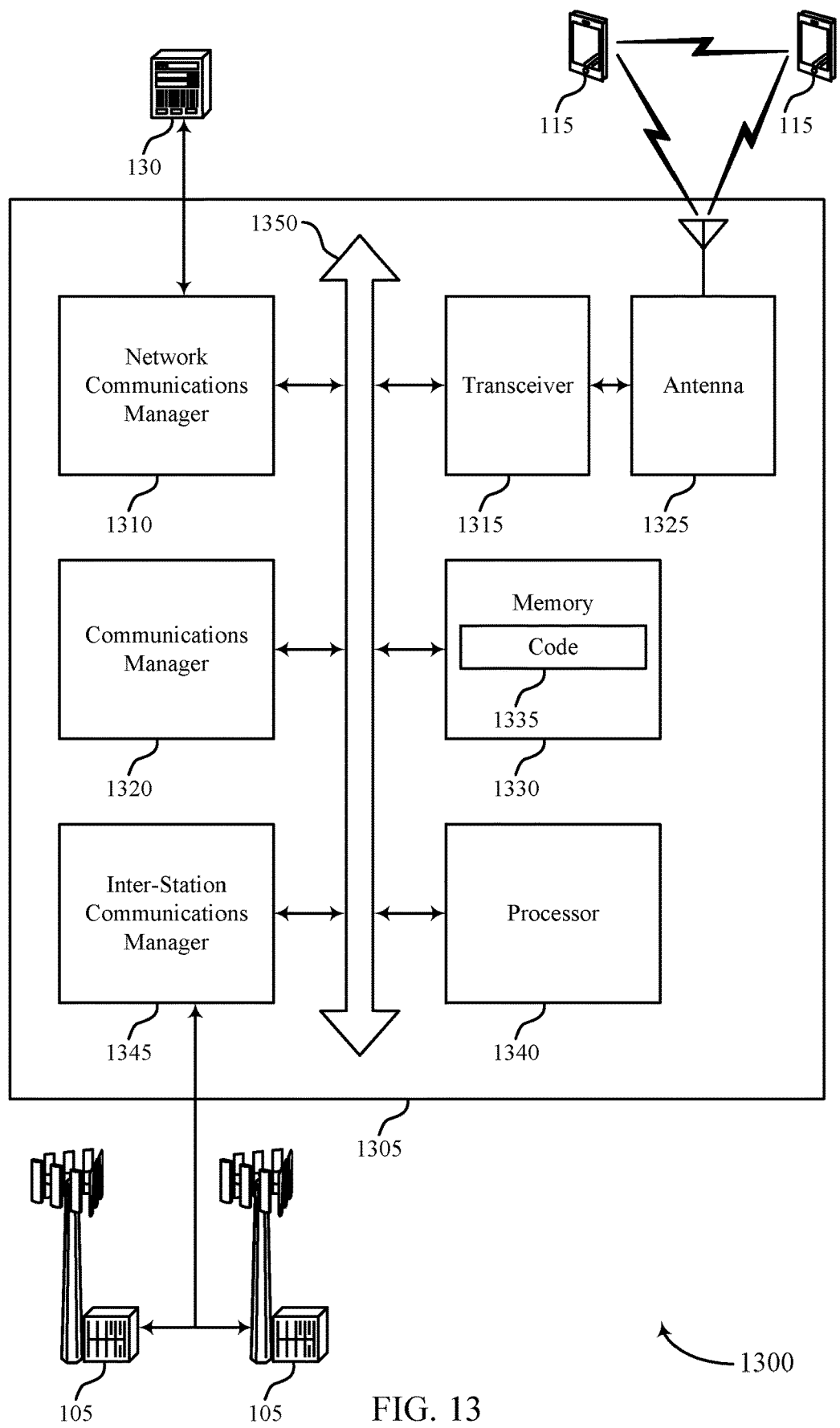
FIG. 13 shows a diagram of a system including a device that supports rank and resource set signaling techniques for multiple TRP communications in accordance with aspects of the present disclosure.

FIG. 13 shows a diagram of a system 1300 including a device 1305 that supports rank and resource set signaling techniques for multiple TRP communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting rank and resource set signaling techniques for multiple TRP communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at the device 1305 (e.g., a base station 105) in accordance with examples as disclosed herein. For example, the communications manager 1320 may be configured as or otherwise support a means for transmitting, to a UE, a control information configuration that indicates a quantity of bits that are to be included in a control information field that indicates one or two SRS resource sets with which a first uplink communication is to be associated. The communications manager 1320 may be configured as or otherwise support a means for determining whether one SRS resource set or two SRS resource sets are associated with the first uplink communication. The communications manager 1320 may be configured as or otherwise support a means for transmitting, to the UE, a first control information communication that includes the control information field and that schedules the first uplink communication for the UE and indicates whether one SRS resource set or two SRS resource sets are associated with the first uplink communication. The communications manager 1320 may be configured as or otherwise support a means for receiving the first uplink communication from the UE based on the first control information communication.

By including or configuring the communications manager 1320 in accordance with examples as described herein, the device 1305 may support techniques for configuring UEs for transmission of multiple repetitions of an uplink communication to multiple different TRPs, such that the different repetitions may use transmission parameters that are suitable for the particular TRP associated with the repetition. Such techniques may allow for enhanced reliability of wireless communications, and thus provide more efficient utilization of communication resources, reduced power consumption (through reduced retransmissions), reduced latency (through reduced retransmission), and more efficient utilization of communication resources. Further, such techniques provide for flexibility in scheduling uplink communications with repetitions based on one or multiple SRS resource sets, which can enhance network efficiency through efficient scheduling of uplink communications in accordance with available network and wireless resources, and using reduced DCI overhead.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of rank and resource set signaling techniques for multiple TRP communications as described herein, or the processor 1340 and the memory 1330 may be otherwise configured to perform or support such operations.

Figure 14:
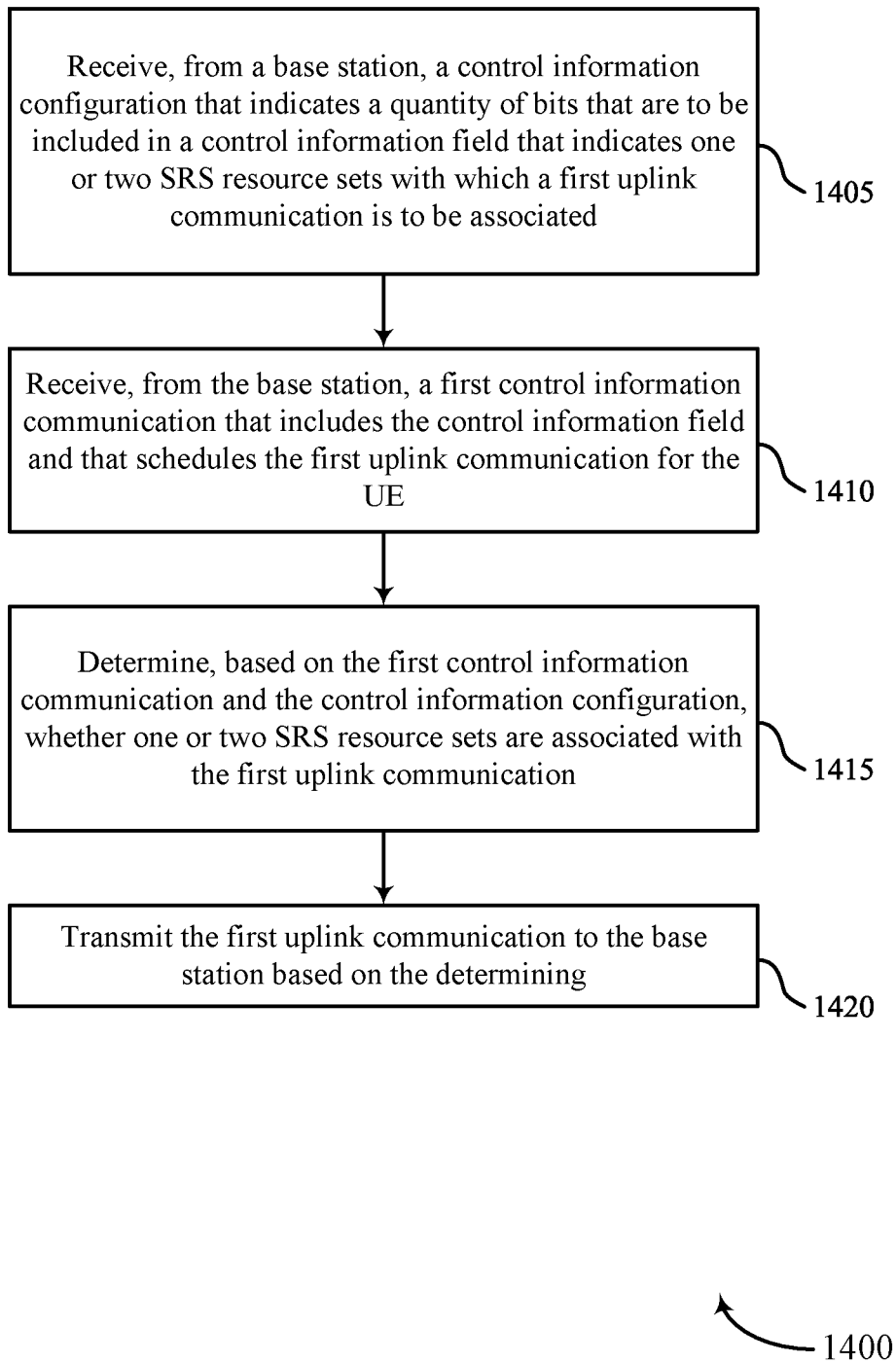
FIGS. 14 through 19 show flowcharts illustrating methods that support rank and resource set signaling techniques for multiple TRP communications in accordance with aspects of the present disclosure.

FIG. 14 shows a flowchart illustrating a method 1400 that supports rank and resource set signaling techniques for multiple TRP communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a control information configuration that indicates a quantity of bits that are to be included in a control information field that indicates one or two SRS resource sets with which a first uplink communication is to be associated. The operations of 1405 may be performed in accordance with examples as disclosed herein. In some examples, aspects of the operations of 1405 may be performed by an SRS configuration manager 825 as described with reference to FIG. 8.

At 1410, the method may include receiving, from the base station, a first control information communication that includes the control information field and that schedules the first uplink communication for the UE. The operations of 1410 may be performed in accordance with examples as disclosed herein. In some examples, aspects of the operations of 1410 may be performed by a control information manager 830 as described with reference to FIG. 8.

At 1415, the method may include determining, based on the first control information communication and the control information configuration, whether one or two SRS resource sets are associated with the first uplink communication. The operations of 1415 may be performed in accordance with examples as disclosed herein. In some examples, aspects of the operations of 1415 may be performed by an SRS resource set manager 835 as described with reference to FIG. 8.

At 1420, the method may include transmitting the first uplink communication to the base station based on the determining. The operations of 1420 may be performed in accordance with examples as disclosed herein. In some examples, aspects of the operations of 1420 may be performed by an uplink communication manager 840 as described with reference to FIG. 8.

Figure 15:
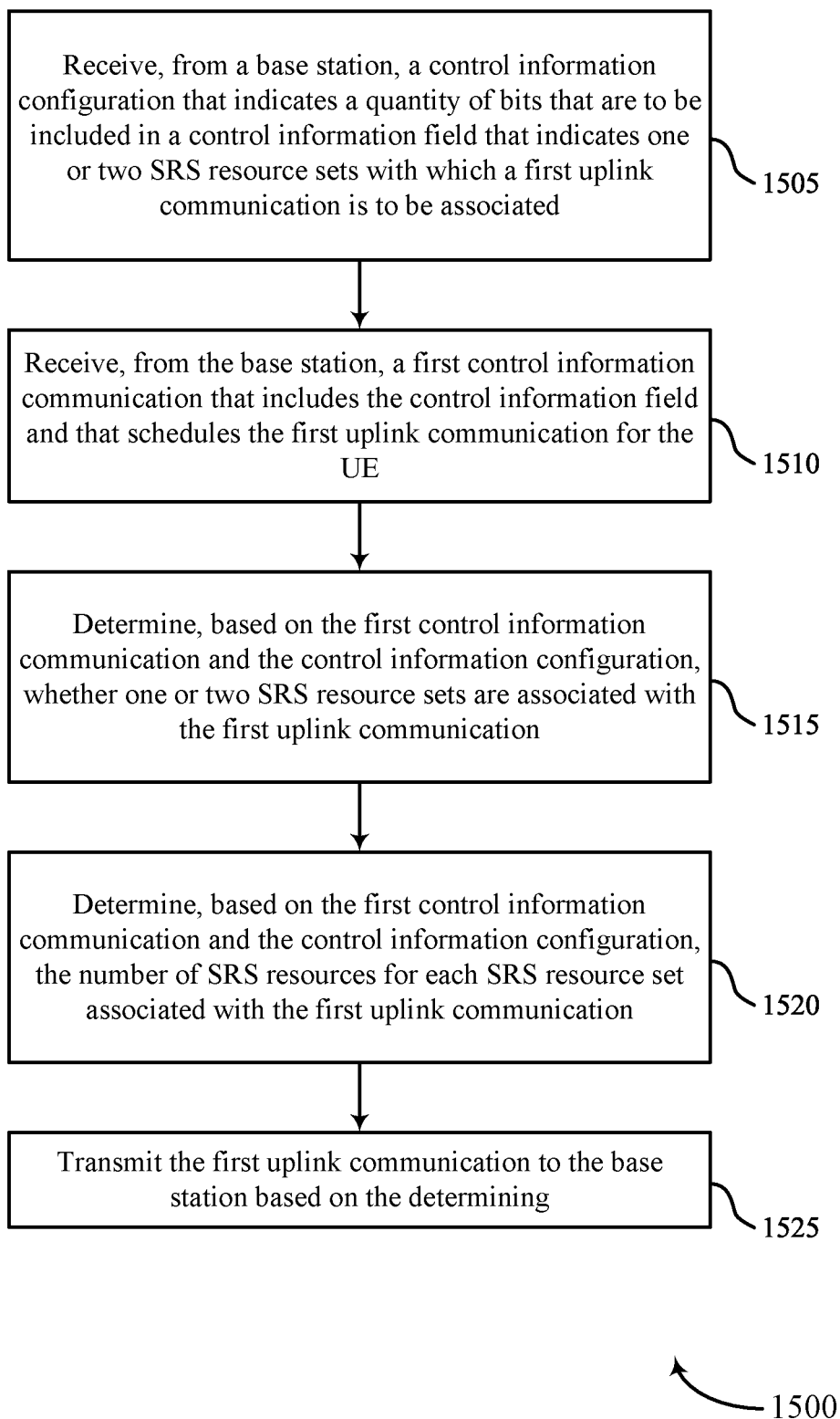

FIG. 15 shows a flowchart illustrating a method 1500 that supports rank and resource set signaling techniques for multiple TRP communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a control information configuration that indicates a quantity of bits that are to be included in a control information field that indicates one or two SRS resource sets with which a first uplink communication is to be associated. The operations of 1505 may be performed in accordance with examples as disclosed herein. In some examples, aspects of the operations of 1505 may be performed by an SRS configuration manager 825 as described with reference to FIG. 8.

At 1510, the method may include receiving, from the base station, a first control information communication that includes the control information field and that schedules the first uplink communication for the UE. The operations of 1510 may be performed in accordance with examples as disclosed herein. In some examples, aspects of the operations of 1510 may be performed by a control information manager 830 as described with reference to FIG. 8.

At 1515, the method may include determining, based on the first control information communication and the control information configuration, whether one or two SRS resource sets are associated with the first uplink communication. The operations of 1515 may be performed in accordance with examples as disclosed herein. In some examples, aspects of the operations of 1515 may be performed by an SRS resource set manager 835 as described with reference to FIG. 8.

At 1520, the method may include determining, based on the first control information communication and the control information configuration, the number of SRS resources for each SRS resource set associated with the first uplink communication. The operations of 1520 may be performed in accordance with examples as disclosed herein. In some examples, aspects of the operations of 1520 may be performed by an SRS resource set manager 835 as described with reference to FIG. 8.

At 1525, the method may include transmitting the first uplink communication to the base station based on the determining. The operations of 1525 may be performed in accordance with examples as disclosed herein. In some examples, aspects of the operations of 1525 may be performed by an uplink communication manager 840 as described with reference to FIG. 8.

Figure 16:
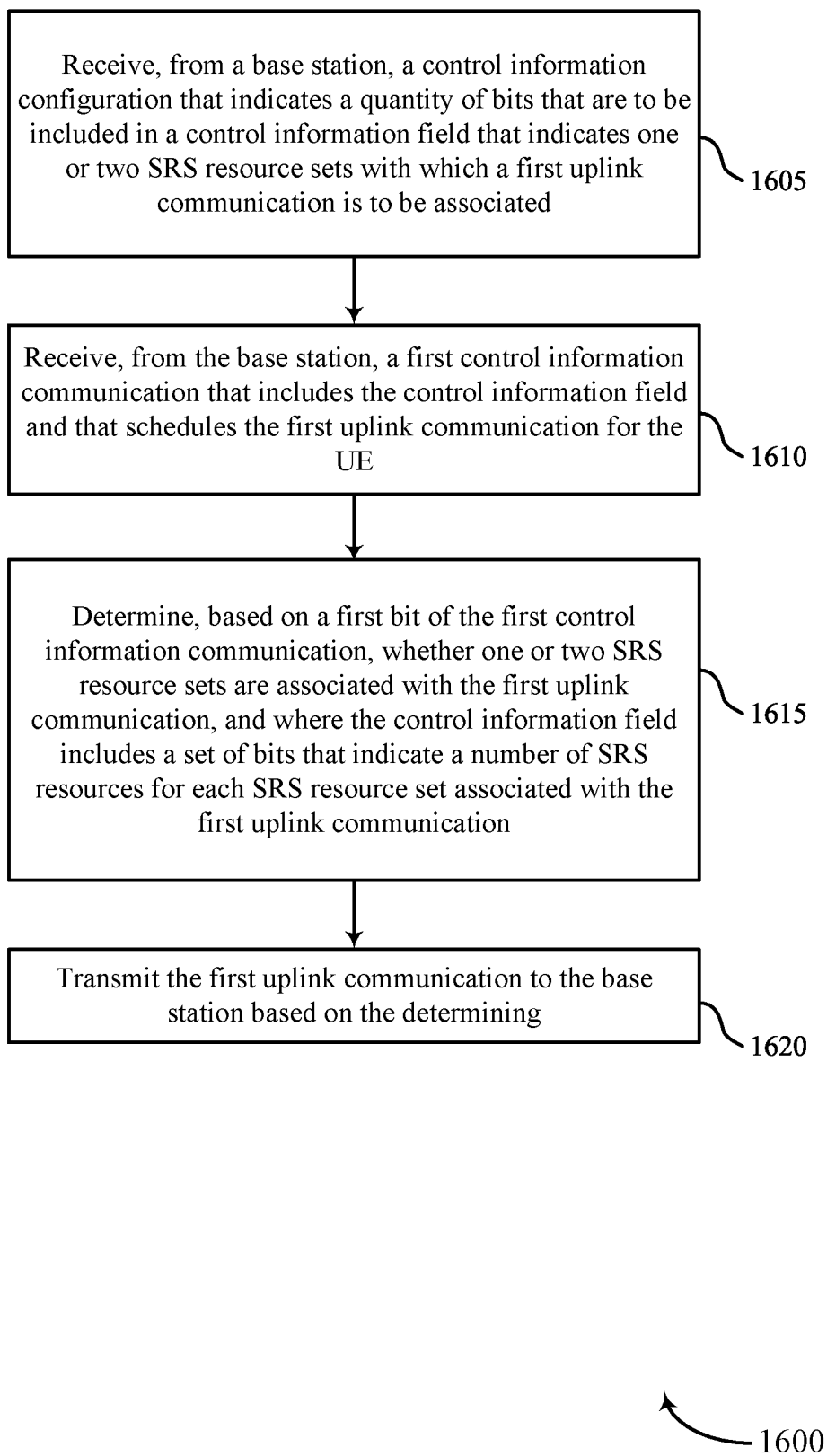

FIG. 16 shows a flowchart illustrating a method 1600 that supports rank and resource set signaling techniques for multiple TRP communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a control information configuration that indicates a quantity of bits that are to be included in a control information field that indicates one or two SRS resource sets with which a first uplink communication is to be associated. The operations of 1605 may be performed in accordance with examples as disclosed herein. In some examples, aspects of the operations of 1605 may be performed by an SRS configuration manager 825 as described with reference to FIG. 8.

At 1610, the method may include receiving, from the base station, a first control information communication that includes the control information field and that schedules the first uplink communication for the UE. The operations of 1610 may be performed in accordance with examples as disclosed herein. In some examples, aspects of the operations of 1610 may be performed by a control information manager 830 as described with reference to FIG. 8.

At 1615, the method may include determining, based on a first bit of the first control information communication, whether one or two SRS resource sets are associated with the first uplink communication, and where the control information field includes a set of bits that indicate a number of SRS resources for each SRS resource set associated with the first uplink communication. The operations of 1615 may be performed in accordance with examples as disclosed herein. In some examples, aspects of the operations of 1615 may be performed by a control information manager 830 as described with reference to FIG. 8.

At 1620, the method may include transmitting the first uplink communication to the base station based on the determining. The operations of 1620 may be performed in accordance with examples as disclosed herein. In some examples, aspects of the operations of 1620 may be performed by an uplink communication manager 840 as described with reference to FIG. 8.

Figure 17:
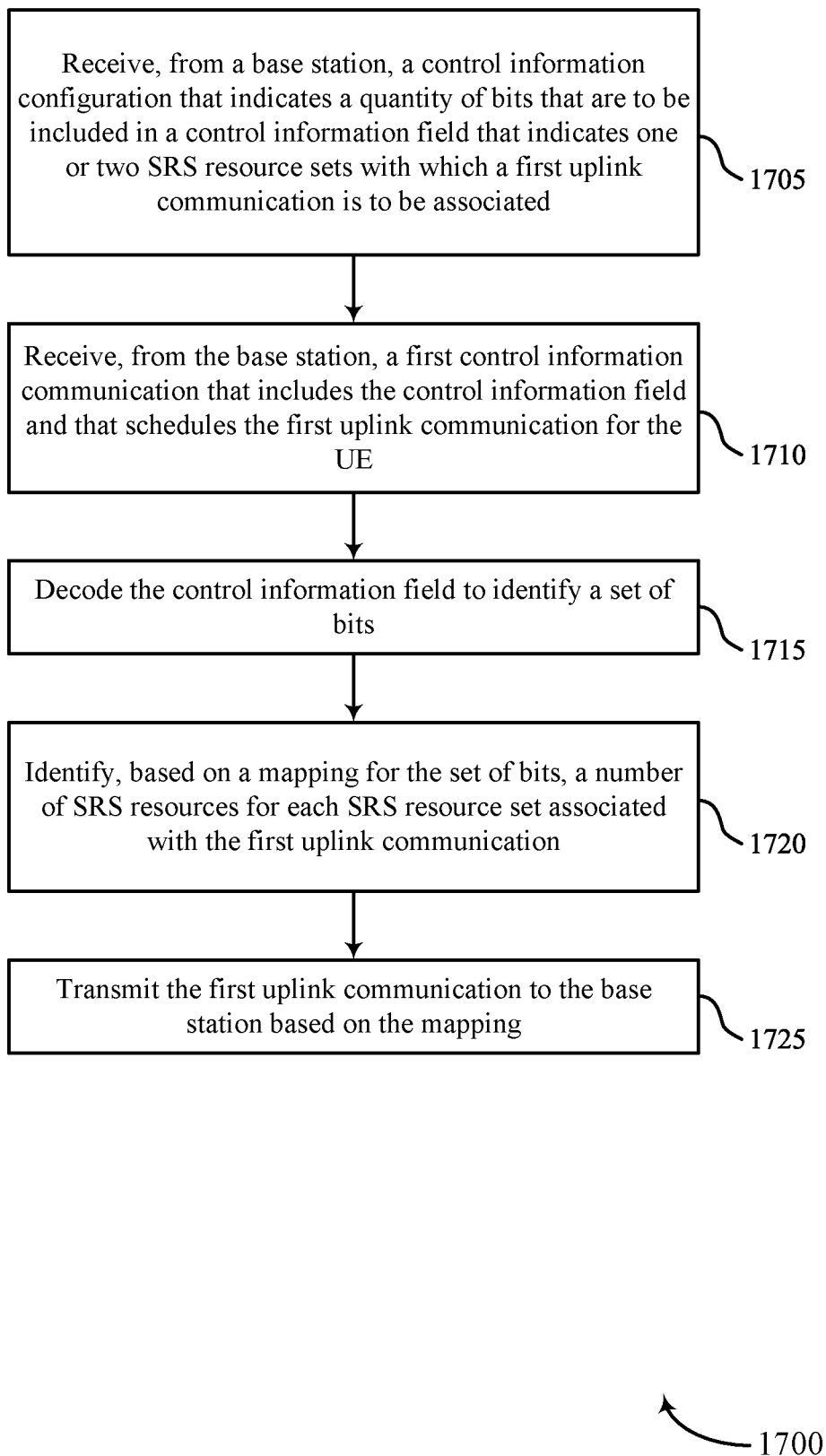

FIG. 17 shows a flowchart illustrating a method 1700 that supports rank and resource set signaling techniques for multiple TRP communications in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a control information configuration that indicates a quantity of bits that are to be included in a control information field that indicates one or two SRS resource sets with which a first uplink communication is to be associated. The operations of 1705 may be performed in accordance with examples as disclosed herein. In some examples, aspects of the operations of 1705 may be performed by an SRS configuration manager 825 as described with reference to FIG. 8.

At 1710, the method may include receiving, from the base station, a first control information communication that includes the control information field and that schedules the first uplink communication for the UE. The operations of 1710 may be performed in accordance with examples as disclosed herein. In some examples, aspects of the operations of 1710 may be performed by a control information manager 830 as described with reference to FIG. 8.

At 1715, the method may include decoding the control information field to identify a set of bits. The operations of 1715 may be performed in accordance with examples as disclosed herein. In some examples, aspects of the operations of 1715 may be performed by a mapping manager 845 as described with reference to FIG. 8.

At 1720, the method may include identifying, based on a mapping for the set of bits, a number of SRS resources for each SRS resource set associated with the first uplink communication. The operations of 1720 may be performed in accordance with examples as disclosed herein. In some examples, aspects of the operations of 1720 may be performed by a mapping manager 845 as described with reference to FIG. 8.

At 1725, the method may include transmitting the first uplink communication to the base station based on the mapping. The operations of 1725 may be performed in accordance with examples as disclosed herein. In some examples, aspects of the operations of 1725 may be performed by an uplink communication manager 840 as described with reference to FIG. 8.

Figure 18:
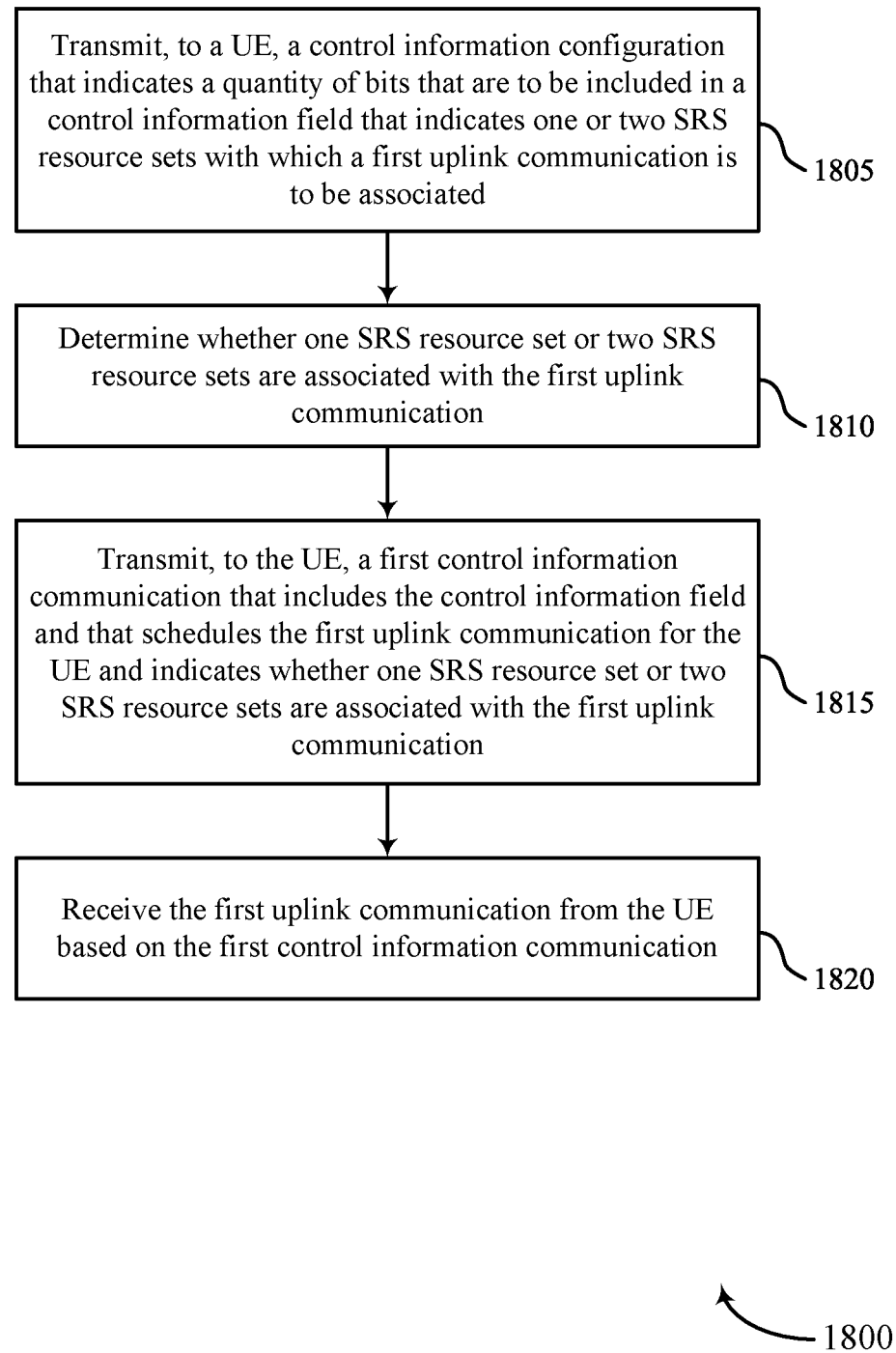

FIG. 18 shows a flowchart illustrating a method 1800 that supports rank and resource set signaling techniques for multiple TRP communications in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a control information configuration that indicates a quantity of bits that are to be included in a control information field that indicates one or two SRS resource sets with which a first uplink communication is to be associated. The operations of 1805 may be performed in accordance with examples as disclosed herein. In some examples, aspects of the operations of 1805 may be performed by an SRS configuration manager 1225 as described with reference to FIG. 12.

At 1810, the method may include determining whether one SRS resource set or two SRS resource sets are associated with the first uplink communication. The operations of 1810 may be performed in accordance with examples as disclosed herein. In some examples, aspects of the operations of 1810 may be performed by an SRS resource set manager 1230 as described with reference to FIG. 12.

At 1815, the method may include transmitting, to the UE, a first control information communication that includes the control information field and that schedules the first uplink communication for the UE and indicates whether one SRS resource set or two SRS resource sets are associated with the first uplink communication. The operations of 1815 may be performed in accordance with examples as disclosed herein. In some examples, aspects of the operations of 1815 may be performed by a control information manager 1235 as described with reference to FIG. 12.

At 1820, the method may include receiving the first uplink communication from the UE based on the first control information communication. The operations of 1820 may be performed in accordance with examples as disclosed herein. In some examples, aspects of the operations of 1820 may be performed by an uplink communication manager 1240 as described with reference to FIG. 12.

Figure 19:
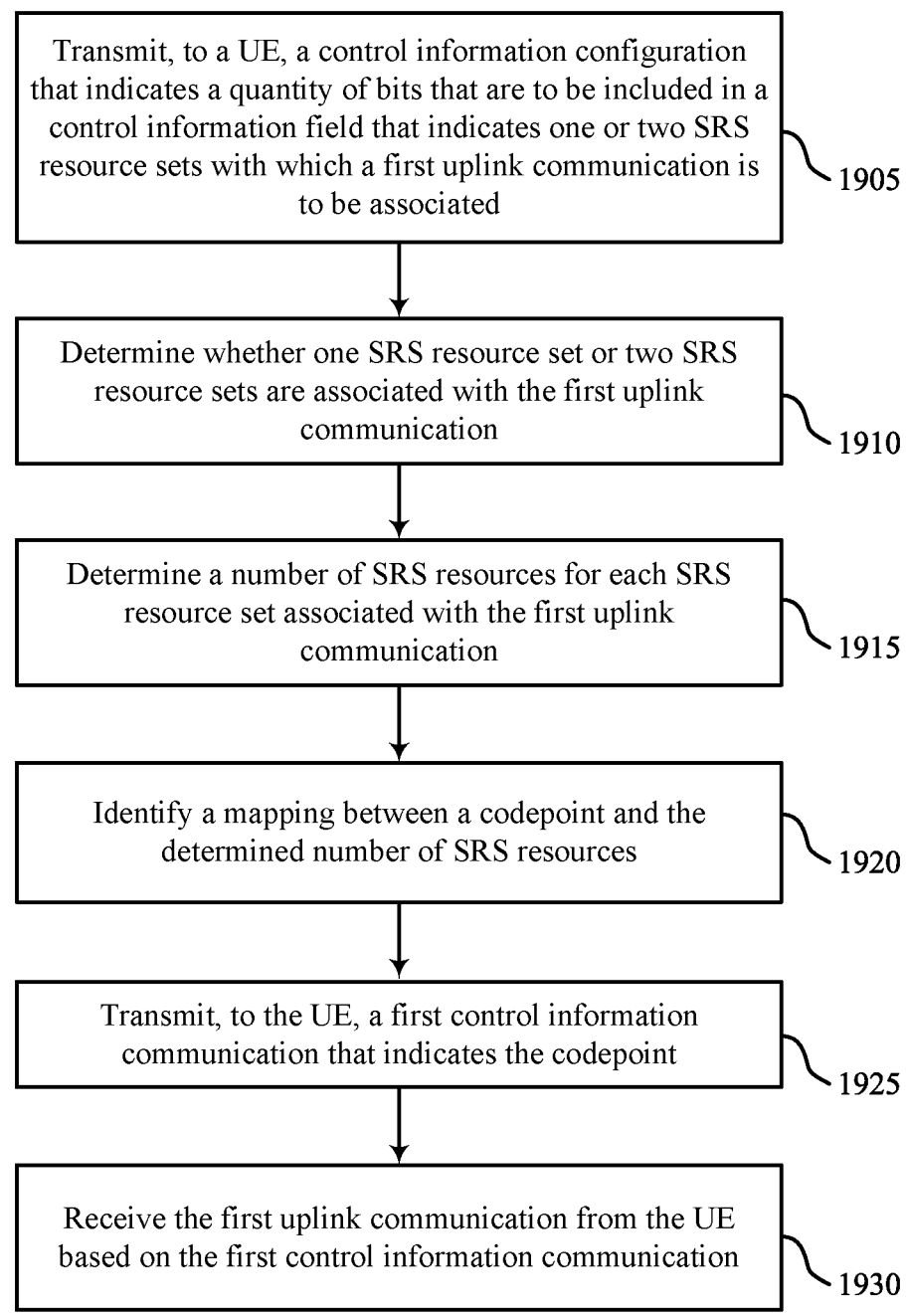

FIG. 19 shows a flowchart illustrating a method 1900 that supports rank and resource set signaling techniques for multiple TRP communications in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a control information configuration that indicates a quantity of bits that are to be included in a control information field that indicates one or two SRS resource sets with which a first uplink communication is to be associated. The operations of 1905 may be performed in accordance with examples as disclosed herein. In some examples, aspects of the operations of 1905 may be performed by an SRS configuration manager 1225 as described with reference to FIG. 12.

At 1910, the method may include determining whether one SRS resource set or two SRS resource sets are associated with the first uplink communication. The operations of 1910 may be performed in accordance with examples as disclosed herein. In some examples, aspects of the operations of 1910 may be performed by an SRS resource set manager 1230 as described with reference to FIG. 12.

At 1915, the method may include determining a number of SRS resources for each SRS resource set associated with the first uplink communication. The operations of 1915 may be performed in accordance with examples as disclosed herein. In some examples, aspects of the operations of 1915 may be performed by a mapping manager 1245 as described with reference to FIG. 12.

At 1920, the method may include identifying a mapping between a codepoint and the determined number of SRS resources. The operations of 1920 may be performed in accordance with examples as disclosed herein. In some examples, aspects of the operations of 1920 may be performed by a mapping manager 1245 as described with reference to FIG. 12.

At 1925, the method may include transmitting, to the UE, a first control information communication that that indicates the codepoint. The operations of 1925 may be performed in accordance with examples as disclosed herein. In some examples, aspects of the operations of 1925 may be performed by a control information manager 1235 as described with reference to FIG. 12.

At 1930, the method may include receiving the first uplink communication from the UE based on the first control information communication. The operations of 1930 may be performed in accordance with examples as disclosed herein. In some examples, aspects of the operations of 1930 may be performed by an uplink communication manager 1240 as described with reference to FIG. 12.

The following provides an overview of aspects of the present disclosure:

Aspect 1: A method for wireless communication at a UE, comprising: receiving, from a base station, a control information configuration that indicates a quantity of bits that are to be included in a control information field that indicates one or two sounding reference signal resource sets with which a first uplink communication is to be associated; receiving, from the base station, a first control information communication that includes the control information field and that schedules the first uplink communication for the UE; determining, based at least in part on the first control information communication and the control information configuration, whether one or two sounding reference signal resource sets are associated with the first uplink communication; and transmitting the first uplink communication to the base station based at least in part on the determining.

Aspect 2: The method of aspect 1, wherein the control information field further indicates a number of sounding reference signal resources to be associated with the first uplink communication, and wherein the determining further comprises: determining, based at least in part on the first control information communication and the control information configuration, the number of sounding reference signal resources for each sounding reference signal resource set associated with the first uplink communication.

Aspect 3: The method of any of aspects 1 through 2, wherein the determining further comprises: determining, based at least in part on a first bit of the first control information communication, whether one or two sounding reference signal resource sets are associated with the first uplink communication, and wherein the control information field includes a set of bits that indicate a number of sounding reference signal resources for each sounding reference signal resource set associated with the first uplink communication.

Aspect 4: The method of aspect 3, wherein the first bit is an initial bit of the control information field, or is in a separate field in the first control information communication.

Aspect 5: The method of any of aspects 3 through 4, wherein the set of bits includes a maximum of a first number of bits or a second number of bits, the first number of bits determined based at least in part on a first maximum rank when one sounding reference signal resource set is associated with the first uplink communication, and the second number of bits determined based at least in part on a second maximum rank when two sounding reference signal resource sets are associated with the first uplink communication.

Aspect 6: The method of aspect 5, wherein the second maximum rank is less than the first maximum rank.

Aspect 7: The method of any of aspects 5 through 6, wherein the second maximum rank is a fixed value or a configured value that is provided with the control information configuration.

Aspect 8: The method of aspect 7, wherein the configured value of the second maximum rank is based at least in part on a capability of the UE that is transmitted to the base station.

Aspect 9: The method of any of aspects 5 through 8, wherein zero-padding is used in the set of bits when a number of bits necessary to indicate the rank of the one or two sounding reference signal resource sets is less than a total number of bits of the set of bits.

Aspect 10: The method of any of aspects 5 through 9, wherein the first number of bits is determined based at least in part on the first sounding reference signal resource set having a different number of sounding reference signal resources than the second sounding reference signal resource set.

Aspect 11: The method of aspect 10, wherein the first number of bits is associated with the first sounding reference signal resource set.

Aspect 12: The method of aspect 5, wherein the first number of bits is associated with either the first sounding reference signal resource set or the second sounding reference signal resource set, and a separate bit in the control information field provides an indication of which of the first sounding reference signal resource set or the second sounding reference signal resource set is associated with the first uplink communication.

Aspect 13: The method of aspect 5, wherein the second number of bits is associated with both the first sounding reference signal resource set and the second sounding reference signal resource set, and a first subset of the second number of bits indicates one or more sounding reference signal resources within the first sounding reference signal resource set and a second subset of the second number of bits indicates one or more sounding reference signal resources within the second sounding reference signal resource set.

Aspect 14: The method of aspect 5, wherein the second number of bits is associated with both the first sounding reference signal resource set and the second sounding reference signal resource set, and provides a joint indication of one or more sounding reference signal resources within each sounding reference signal resource set based on a same number of layers associated with each sounding reference signal resource set.

Aspect 15: The method of aspect 1, wherein the determining further comprises: decoding the control information field to identify a set of bits; and identifying, based at least in part on a mapping for the set of bits, a number of sounding reference signal resources for each sounding reference signal resource set associated with the first uplink communication.

Aspect 16: The method of aspect 15, wherein a first sounding reference signal resource set is ordered ahead of a second sounding reference signal resource set, and the quantity of bits that are included in the control information field is determined as a sum of a first number of possibilities to indicate a first number of sounding reference signal resources associated with the first sounding reference signal resource set when a single sounding reference signal resource set is associated with the first uplink communication, and a second number of possibilities to indicate a second number of sounding reference signal resources associated with both the first and the second sounding reference signal resource set when both the first sounding reference signal resource set and the second sounding reference signal resource set are associated with the first uplink communication.

Aspect 17: The method of aspect 15, wherein: a first sounding reference signal resource set or a second sounding reference signal resource set is ordered as an initial sounding reference signal resource set; and the quantity of bits that are included in the control information field is determined as a sum of a first number of possibilities to indicate a first number of sounding reference signal resources associated with the initial sounding reference signal resource set when a single sounding reference signal resource set is associated with the first uplink communication, and a second number of possibilities to indicate a second number of sounding reference signal resources associated with both the first and the second sounding reference signal resource set when a both the first sounding reference signal resource set and the second sounding reference signal resource set are associated with the first uplink communication.

Aspect 18: The method of any of aspects 15 through 17, wherein different bit values of the control information field are mapped to different possibilities of a number of the sounding reference signal resources that are associated with the first uplink communication.

Aspect 19: A method for wireless communication at a base station, comprising: transmitting, to a UE, a control information configuration that indicates a quantity of bits that are to be included in a control information field that indicates one or two sounding reference signal resource sets with which a first uplink communication is to be associated; determining whether one sounding reference signal resource set or two sounding reference signal resource sets are associated with the first uplink communication; transmitting, to the UE, a first control information communication that includes the control information field and that schedules the first uplink communication for the UE and indicates whether one sounding reference signal resource set or two sounding reference signal resource sets are associated with the first uplink communication; and receiving the first uplink communication from the UE based at least in part on the first control information communication.

Aspect 20: The method of aspect 19, wherein the control information field further indicates a number of sounding reference signal resources to be associated with the first uplink communication.

Aspect 21: The method of any of aspects 19 through 20, wherein a first bit of the first control information communication indicates whether one or two sounding reference signal resource sets are associated with the first uplink communication, and wherein the control information field includes a set of bits that indicate a number of sounding reference signal resources for each sounding reference signal resource set associated with the first uplink communication.

Aspect 22: The method of aspect 21, wherein the first bit is an initial bit of the control information field, or is in a separate field in the first control information communication.

Aspect 23: The method of any of aspects 21 through 22, wherein the set of bits includes a maximum of a first number of bits or a second number of bits, the first number of bits determined based at least in part on a first maximum rank when one sounding reference signal resource set is associated with the first uplink communication, and the second number of bits determined based at least in part on a second maximum rank set when two sounding reference signal resource sets are associated with the first uplink communication.

Aspect 24: The method of aspect 23, wherein the second maximum rank is less than the first maximum rank.

Aspect 25: The method of any of aspects 23 through 24, wherein the second maximum rank is a fixed value or a configured value that is provided with the control information configuration.

Aspect 26: The method of aspect 25, wherein the configured value of the second maximum rank is based at least in part on a capability of the UE that is transmitted to the base station.

Aspect 27: The method of any of aspects 23 through 26, wherein zero-padding is used in the set of bits when a number of bits necessary to indicate the rank of the one or two sounding reference signal resource sets is less than a total number of bits of the set of bits.

Aspect 28: The method of any of aspects 23 through 27, wherein the first number of bits is determined based at least in part on the first sounding reference signal resource set having a different number of sounding reference signal resources than the second sounding reference signal resource set.

Aspect 29: The method of aspect 28, wherein the first number of bits is associated with the first sounding reference signal resource set.

Aspect 30: The method of aspects 23, wherein the first number of bits is associated with either the first sounding reference signal resource set or the second sounding reference signal resource set, and a separate bit in the control information field provides an indication of which of the first sounding reference signal resource set or the second sounding reference signal resource set is associated with the first uplink communication.

Aspect 31: The method of aspect 23, wherein the second number of bits is associated with both the first sounding reference signal resource set and the second sounding reference signal resource set, and a first subset of the second number of bits indicates one or more sounding reference signal resources within the first sounding reference signal resource set and a second subset of the second number of bits indicates one or more sounding reference signal resources within the second sounding reference signal resource set.

Aspect 32: The method of aspect 23, wherein the second number of bits is associated with both the first sounding reference signal resource set and the second sounding reference signal resource set, and provides a joint indication of one or more sounding reference signal resources within each sounding reference signal resource set based on a same number of layers associated with each sounding reference signal resource set.

Aspect 33: The method of aspect 19, further comprising: determining a number of sounding reference signal resources for each sounding reference signal resource set associated with the first uplink communication; identifying a mapping between a codepoint and the determined number of sounding reference signal resources, and wherein the control information field indicates the codepoint.

Aspect 34: The method of aspect 33, wherein different bit values of the control information field are mapped to different possibilities of the sounding reference signal resources that are associated with the first uplink communication.

Aspect 35: The method of aspect 19, wherein a first sounding reference signal resource set is ordered ahead of a second sounding reference signal resource set, and the quantity of bits that are included in the control information field is determined as a sum of a first number of possibilities to indicate a first number of sounding reference signal resources associated with the first sounding reference signal resource set when a single sounding reference signal resource set is associated with the first uplink communication, and a second number of possibilities to indicate a second number of sounding reference signal resources associated with both the first and the second sounding reference signal resource set when both the first sounding reference signal resource set and the second sounding reference signal resource set are associated with the first uplink communication.

Aspect 36: The method of aspect 19, wherein: a first sounding reference signal resource set or a second sounding reference signal resource set is ordered as an initial sounding reference signal resource set; and the quantity of bits that are included in the control information field is determined as a sum of a first number of possibilities to indicate a first number of sounding reference signal resources associated with the initial sounding reference signal resource set when a single sounding reference signal resource set is associated with the first uplink communication, and a second number of possibilities to indicate a second number of sounding reference signal resources associated with both the first and the second sounding reference signal resource set when a both the first sounding reference signal resource set and the second sounding reference signal resource set are associated with the first uplink communication.

Aspect 37: An apparatus for wireless communication at a UE, comprising a processor; memory coupled with the processor; and instructions stored in the memory and executable by the processor to cause the apparatus to perform a method of any of aspects 1 through 18.

Aspect 38: An apparatus for wireless communication at a UE, comprising at least one means for performing a method of any of aspects 1 through 18.

Aspect 39: A non-transitory computer-readable medium storing code for wireless communication at a UE, the code comprising instructions executable by a processor to perform a method of any of aspects 1 through 18.

Aspect 40: An apparatus for wireless communication at a base station, comprising a processor; memory coupled with the processor; and instructions stored in the memory and executable by the processor to cause the apparatus to perform a method of any of aspects 19 through 36.

Aspect 41: An apparatus for wireless communication at a base station, comprising at least one means for performing a method of any of aspects 19 through 36.

Aspect 42: A non-transitory computer-readable medium storing code for wireless communication at a base station, the code comprising instructions executable by a processor to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station via a first control information communication, a control information configuration that indicates how many bits are to-be used for a control information field in a second first control information communication, wherein the control information field indicates, via the set of bits, one of two sounding reference signal resource sets with which a first uplink communication is to be associated;
   receiving, from the base station, the second control information communication that includes the control information field and that schedules a first uplink communication for the UE, wherein the control information field indicates one or two sounding reference signal resource sets associated with the first uplink communication;
   determining, based at least in part on the second control information communication and the control information configuration, whether one or two sounding reference signal resource sets are associated with the first uplink communication; and
   transmitting the first uplink communication to the base station based at least in part on the determining.

2. The method of claim 1, wherein the control information field further indicates a number of sounding reference signal resources to be associated with the first uplink communication, and wherein the determining further comprises:
   determining, based at least in part on the second control information communication and the control information configuration, the number of sounding reference signal resources for each sounding reference signal resource set associated with the first uplink communication.

3. The method of claim 1, wherein the determining further comprises:
   determining, based at least in part on a first bit of the second control information communication, whether one or two sounding reference signal resource sets are associated with the first uplink communication, and wherein the control information field includes a set of bits that indicate a number of sounding reference signal resources for each sounding reference signal resource set associated with the first uplink communication.

4. The method of claim 3, wherein the first bit is an initial bit of the control information field, or is in a separate field in the second control information communication.

5. The method of claim 3, wherein the set of bits includes a maximum of a first number of bits or a second number of bits, the first number of bits determined based at least in part on a first maximum rank when one sounding reference signal resource set is associated with the first uplink communication, and the second number of bits determined based at least in part on a second maximum rank when two sounding reference signal resource sets are associated with the first uplink communication.

6. The method of claim 5, wherein the second maximum rank is less than the first maximum rank.

7. The method of claim 5, wherein the second maximum rank is a fixed value or a configured value that is provided with the control information configuration.

8. The method of claim 7, wherein the configured value of the second maximum rank is based at least in part on a capability of the UE that is transmitted to the base station.

9. The method of claim 5, wherein zero-padding is used in the set of bits when a number of bits necessary to indicate a rank of the one or two sounding reference signal resource sets is less than a total number of bits of the set of bits.

10. The method of claim 5, wherein the first number of bits is determined based at least in part on a first sounding reference signal resource set having a different number of sounding reference signal resources than a second sounding reference signal resource set.

11. The method of claim 10, wherein the first number of bits is associated with the first sounding reference signal resource set.

12. The method of claim 10, wherein the first number of bits is associated with either the first sounding reference signal resource set or the second sounding reference signal resource set, and a separate bit in the control information field provides an indication of which of the first sounding reference signal resource set or the second sounding reference signal resource set is associated with the first uplink communication.

13. The method of claim 5, wherein the second number of bits is associated with both a first sounding reference signal resource set and a second sounding reference signal resource set, and a first subset of the second number of bits indicates one or more sounding reference signal resources within the first sounding reference signal resource set and a second subset of the second number of bits indicates one or more sounding reference signal resources within the second sounding reference signal resource set.

14. The method of claim 5, wherein the second number of bits is associated with both a first sounding reference signal resource set and a second sounding reference signal resource set, and provides a joint indication of one or more sounding reference signal resources within each sounding reference signal resource set based on a same number of layers associated with each sounding reference signal resource set.

15. The method of claim 1, wherein the determining further comprises:
    decoding the control information field to identify a set of bits; and identifying, based at least in part on a mapping for the set of bits, a number of sounding reference signal resources for each sounding reference signal resource set associated with the first uplink communication.

16. The method of claim 15, wherein a first sounding reference signal resource set is ordered ahead of a second sounding reference signal resource set, and a quantity of bits of the set of bits that are included in the control information field is determined as a sum of a first number of possibilities to indicate a first number of sounding reference signal resources associated with the first sounding reference signal resource set when a single sounding reference signal resource set is associated with the first uplink communication, and a second number of possibilities to indicate a second number of sounding reference signal resources associated with both the first and the second sounding reference signal resource set when both the first sounding reference signal resource set and the second sounding reference signal resource set are associated with the first uplink communication.

17. The method of claim 15, wherein:
a first sounding reference signal resource set or a second sounding reference signal resource set is ordered as an initial sounding reference signal resource set; and
a quantity of bits of the set of bits that are included in the control information field is determined as a sum of a first number of possibilities to indicate a first number of sounding reference signal resources associated with the initial sounding reference signal resource set when a single sounding reference signal resource set is associated with the first uplink communication, and a second number of possibilities to indicate a second number of sounding reference signal resources associated with both the first and the second sounding reference signal resource set when a both the first sounding reference signal resource set and the second sounding reference signal resource set are associated with the first uplink communication.

18. The method of claim 15, wherein different bit values of the control information field are mapped to different possibilities of the number of sounding reference signal resources that are associated with the first uplink communication.

19. A method for wireless communication at a base station, comprising:
transmitting, to a user equipment (UE) via a first control information communication, a control information configuration that indicates how many bits are to-be used for a control information field in a second control information communication;
determining whether one sounding reference signal resource set or two sounding reference signal resource sets are associated with a first uplink communication;
transmitting, to the UE, the second control information communication that includes the control information field and that schedules the first uplink communication for the UE and indicates whether one sounding reference signal resource set or two sounding reference signal resource sets are associated with the first uplink communication; and
receiving the first uplink communication from the UE based at least in part on the second control information communication.

20. The method of claim 19, wherein the control information field further indicates a number of sounding reference signal resources to be associated with the first uplink communication.

* * * * *